US011704568B2

(12) United States Patent
Laput et al.

(10) Patent No.: US 11,704,568 B2
(45) Date of Patent: Jul. 18, 2023

(54) METHOD AND SYSTEM FOR HAND ACTIVITY SENSING

(71) Applicant: Carnegie Mellon University, Pittsburgh, PA (US)

(72) Inventors: Gierad Laput, Pittsburgh, PA (US); Christopher Harrison, Pittsburgh, PA (US)

(73) Assignee: CARNEGIE MELLON UNIVERSITY, Pittsburgh, PA (US)

(*) Notice: Subject to any disclaimer, the term of this patent is extended or adjusted under 35 U.S.C. 154(b) by 504 days.

(21) Appl. No.: 16/597,404

(22) Filed: Oct. 9, 2019

(65) Prior Publication Data
US 2020/0117889 A1  Apr. 16, 2020

Related U.S. Application Data
(60) Provisional application No. 62/766,396, filed on Oct. 16, 2018.

(51) Int. Cl.
*G06N 20/00* (2019.01)
*G06N 3/082* (2023.01)
*G06V 40/20* (2022.01)
*G06F 18/24* (2023.01)

(52) U.S. Cl.
CPC .......... *G06N 3/082* (2013.01); *G06F 18/24* (2023.01); *G06N 20/00* (2019.01); *G06V 40/28* (2022.01)

(58) Field of Classification Search
CPC .. G06K 9/00355; G06K 9/6267; G06N 20/00; G06N 3/0454
See application file for complete search history.

(56) References Cited

U.S. PATENT DOCUMENTS

| | | | | |
|---|---|---|---|---|
| 9,649,558 B2* | 5/2017 | Stafford | ................ | G06V 40/11 |
| 9,685,097 B2* | 6/2017 | Hoover | ............. | G09B 19/0092 |
| 10,201,746 B1* | 2/2019 | Sarrafzadeh | ......... | A61B 5/7264 |
| 2004/0073414 A1* | 4/2004 | Bienenstock | ........... | G06F 3/015 |
| | | | | 703/2 |
| 2009/0164219 A1* | 6/2009 | Yeung | ...................... | G06F 3/01 |
| | | | | 704/258 |
| 2014/0278208 A1* | 9/2014 | Donaldson | ............ | A61B 5/1118 |
| | | | | 702/141 |
| 2015/0140524 A1* | 5/2015 | Giraud-Carrier | ...... | A47G 23/10 |
| | | | | 434/127 |
| 2016/0018872 A1* | 1/2016 | Tu | ........................ | G06F 1/3287 |
| | | | | 345/173 |
| 2016/0018900 A1* | 1/2016 | Tu | .......................... | G06F 1/163 |
| | | | | 345/156 |

(Continued)

OTHER PUBLICATIONS

Laput et al., "Investigating Fine-Grained Hand Activity Sensing with Commodity Smartwatches," Proceedings of the ACM annual conference on Human Factors in Computing Systems, May 4, 2019, 14 pages.

*Primary Examiner* — Solomon G Bezuayehu
(74) *Attorney, Agent, or Firm* — Amin, Turocy & Watson, LLP

(57) ABSTRACT

Systems and techniques for facilitating hand activity sensing are presented. In one example, a system obtains, from a wrist-worn computational device, hand activity data associated with a sustained series of hand motor actions in performance of a human task. The system also employs a machine learning technique to determine classification data indicative of a classification for the human task.

17 Claims, 13 Drawing Sheets

(56) References Cited

U.S. PATENT DOCUMENTS

| | | | |
|---|---|---|---|
| 2016/0059412 A1* | 3/2016 | Oleynik | B25J 15/0095 |
| | | | 700/250 |
| 2016/0198995 A1* | 7/2016 | Yeung | A61B 5/1118 |
| | | | 600/595 |
| 2017/0031453 A1* | 2/2017 | Presura | A61B 5/02438 |
| 2017/0182362 A1* | 6/2017 | McLeod | A61B 5/681 |
| 2017/0195629 A1* | 7/2017 | Wexler | G06V 20/10 |
| 2017/0308118 A1* | 10/2017 | Ito | G06F 1/163 |
| 2018/0056123 A1* | 3/2018 | Narasimha Rao | G09B 19/0038 |
| 2018/0172441 A1* | 6/2018 | Hogue | H04B 1/00 |
| 2018/0232890 A1* | 8/2018 | Banerjee | G06F 3/033 |
| 2018/0279919 A1* | 10/2018 | Bansbach | A61B 5/1118 |
| 2018/0338720 A1* | 11/2018 | Gupta | G06F 1/163 |
| 2019/0073525 A1* | 3/2019 | Kim | G06V 40/28 |
| 2019/0175077 A1* | 6/2019 | Zhang | A61B 5/681 |
| 2019/0228640 A1* | 7/2019 | Freedman | G08B 21/18 |
| 2020/0019242 A1* | 1/2020 | Atlas | G06N 20/00 |
| 2020/0258365 A1* | 8/2020 | Ten Kate | G08B 21/0446 |
| 2020/0276488 A1* | 9/2020 | Cottam | G16H 40/63 |
| 2021/0096649 A1* | 4/2021 | Mok | G06F 3/016 |

* cited by examiner

METHOD AND SYSTEM FOR HAND ACTIVITY SENSING

CROSS-REFERENCE TO RELATED APPLICATIONS

This subject patent application claims priority to, U.S. Provisional Patent Application No. 62/766,396, filed Oct. 16, 2018, and titled "Method and System for Hand Activity Sensing," the entirety of which application is hereby incorporated herein by reference.

TECHNICAL FIELD

This disclosure relates generally to signal processing and/or machine learning for activity sensing related to electronic devices.

BACKGROUND

Activity sensing (e.g., human activity sensing) has been an area of technical research for several decades. The advent of robust mobile sensing platforms and the ubiquity of smartphones has served to further accelerate research in this domain. Furthermore, in just the past few years, wearable technologies have emerged. Today, many consumer smartphones and smartwatches include built-in activity sensing capabilities that can distinguish between activities such as, for example, walking, biking, driving and sleeping. However, conventional activity sensing can be improved.

SUMMARY

The following presents a simplified summary of the specification in order to provide a basic understanding of some aspects of the specification. This summary is not an extensive overview of the specification. It is intended to neither identify key or critical elements of the specification, nor delineate any scope of the particular implementations of the specification or any scope of the claims. Its sole purpose is to present some concepts of the specification in a simplified form as a prelude to the more detailed description that is presented later.

According to an embodiment, a system comprises a memory that stores computer executable components. The system also comprises a processor that executes the computer executable components stored in the memory. The computer executable components comprise an inertial measurement unit (IMU) component and a machine learning component. The IMU component obtains, from a wrist-worn computational device, hand activity data associated with a sustained series of hand motor actions in performance of a human task. The machine learning component employs a machine learning algorithm to determine classification data indicative of a classification for the human task.

According to another embodiment, a method is provided. The method provides for obtaining, by a wrist-worn computational device comprising a processor, hand activity data associated with a sustained series of hand motor actions in performance of a human task. The method also provides for employing, by the wrist-worn computational device, a machine learning algorithm to determine classification data indicative of a classification for the human task.

According to yet another embodiment, a computer readable storage device comprising instructions that, in response to execution, cause a system comprising a processor to perform operations. The operations comprise obtaining, from a wrist-worn computational device, hand activity data associated with a sustained series of hand motor actions in performance of a human task. The operations also comprise employing a machine learning algorithm to determine classification data indicative of a classification for the human task.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, implementations, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
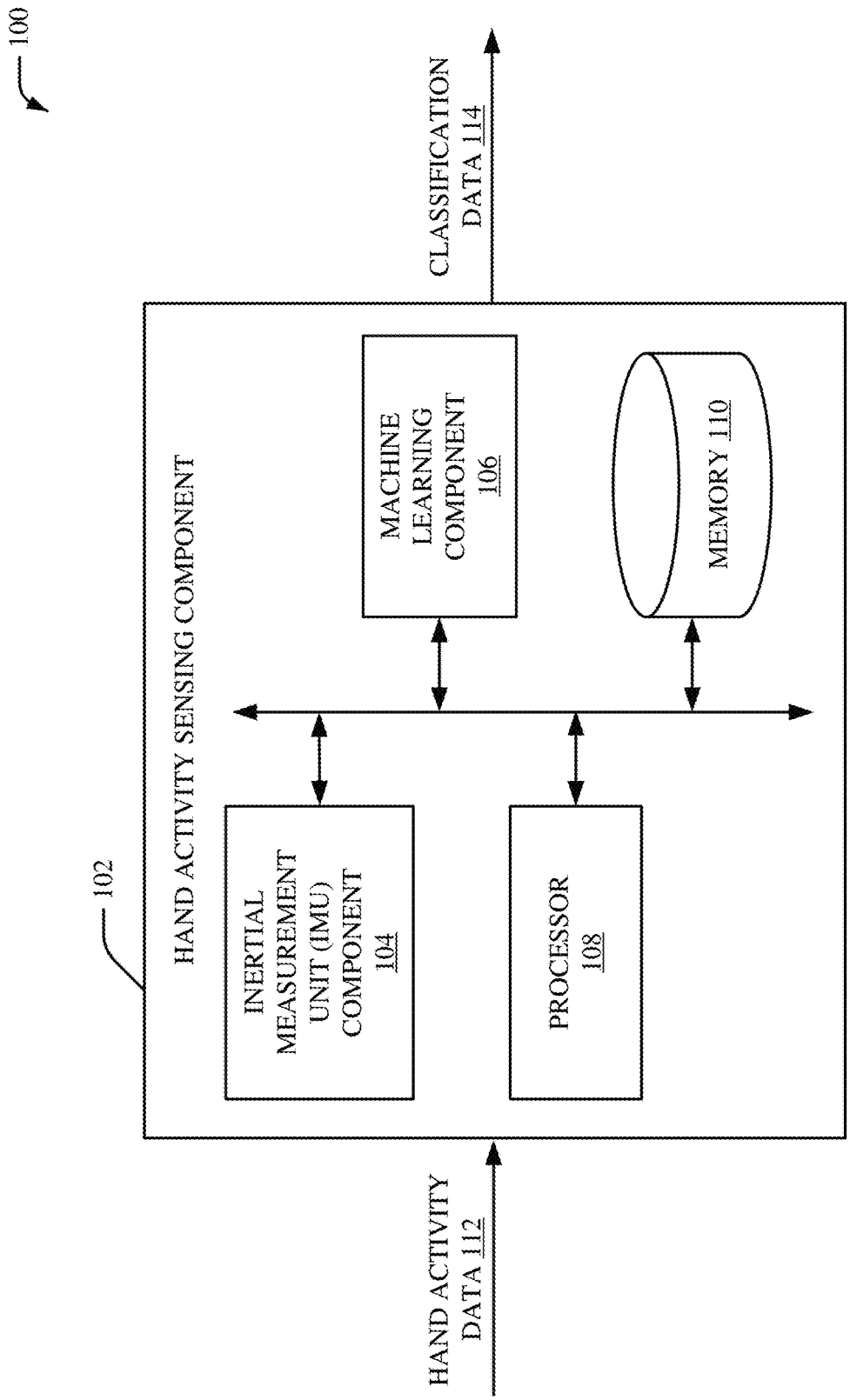
FIG. 1 illustrates a high-level block diagram of an example hand activity sensing component, in accordance with one or more embodiments described herein.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure may be practiced without these specific details, or with other methods, components, materials, etc. In other instances, well-known structures and devices are shown in block diagram form to facilitate describing one or more aspects.

Activity sensing (e.g., human activity sensing) is a technological field that employs sensors, data mining techniques and/or machine learning techniques to model a variety of human activities. Today, many consumer smartphones and smartwatches include built-in activity sensing capabilities that can distinguish between activities such as, for example, walking, biking, driving and sleeping. Generally, classified data for activity sensing is exposed to users for fitness informatics applications and personal informatics applications. Thus, activity sensing generally focuses on locomotion (or the lack thereof) related to body activity. However, conventional activity sensing techniques that focus on locomotion related to body activity ignores a rich and expansive landscape of fine-grained human actions such as, for example, hand activities undertaken by the hands. These hand activities and often independent of body activity. For example, a user can type on their smartphone (e.g., a type of hand activity) while walking (e.g., a type of body activity). In another example, a user can take a sip of water from a bottle (e.g., a type of hand activity) while jogging (e.g., a type of body activity). In yet another example, a user can flip through a book (e.g., a type of hand activity) while lying in bed (e.g., a type of body activity).

To address these and/or other issues associated with conventional activity sensing techniques, embodiments described herein include systems, computer-implemented methods, and computer program products for hand activity sensing. In an aspect, a computing systems that determines activity of both the body and the hands can be provided. As such, informatics applications can be more context sensitive and assistive to immediate, ongoing tasks. In an embodiment, a smartwatch and/or another type of wearable device can be employed for capturing rich, everyday actions by a user. In another embodiment, robust sensing of hand activity can be provided. For example, fine-grained hand activity recognition associated with a wearable device can be provided. In certain embodiments, fine-grained hand activity recognition associated with a wearable device can be provided without external infrastructure and/or instrumentation of objects. In yet another embodiment, sensing, signal processing and/or machine learning can be employed to facilitate sensing of hand activity. The hand activity sensing techniques disclosed herein can accurately sense and/or identify fine-grained hand activities for a wide range of applications including, but not limited to, personal informatics, health-related applications, health assessment applications, healthcare monitoring, automatic skill assessment, context-awareness applications, fitness informatics applications and/or one or more other applications. In one example, a computing system that determines activity of both the body and the hands can intelligently avoid interruptions. In certain embodiments, hand activity detection can additionally or alternatively be employed to identify onset of harmful activity patterns (e.g., repetitive strain injury, hand-arm vibration syndrome, etc.) and/or for building healthy habits (e.g., regularly performed teeth brushing, regular performed hand washing, etc.).

In an example implementation, a system associated with a wearable device (e.g., a smartwatch) that includes custom software associated with hand activity sensing can be employed to enable a high-speed sampling mode. The system can capture gross orientation of a hands of a user associated with the wearable device. Additionally or alternatively, the system can capture movement of the hands of the user associated with the wearable device. Additionally or alternatively, the system can capture bio-acoustic information resulting from hand activities of the user associated with the wearable device. A processor of the wearable device can store incoming readings associated with the hand activities into a buffer such as, for example, an 8192-length circular buffer (e.g., one per axis). Furthermore, in an embodiment, the system can perform a fast Fourier transform (FFT) on the buffer, yielding, for example, 4096 frequency bins with a ~0.5 Hz resolution per bin. In certain embodiments, a filtering operation can be performed to utilize only the lower 256 FFT bins representing frequencies from 0-128 Hz. In another embodiment, the 256 FFT bins can be converted into a 48-frame rolling spectrogram. For example, the 256 FFT bins can be converted into a 48-frame rolling spectrogram representing approximately 3 seconds of data. In an aspect, the rolling spectrogram can be generated for each of three accelerometer axes associated with the wearable device. Additionally or alternatively, the rolling spectrogram can be generated for each of three gyroscope axes associated with the wearable device. In yet another embodiment, one or more patterns from the rolling spectrogram can be extracted and/or modeled. For instance, spatial-temporal relationships encoded in the three accelerometer axes and/or the three gyroscope axes can be determined. In an example, for a particular hand activity associated with wiping a table, data for a Z-axis of the accelerometer can be mostly unperturbed (e.g., mostly bio-acoustic noise resulting from friction, but little coarse motion), while data for the X-axis of the accelerometer and/or the Y-axis of the accelerometer can include low frequency oscillations as the hand slides on the surface, often in a linear motion or circling motion. As such, numerous different hand activities with distinctive activation patterns can be determined and/or learned. In yet another embodiment, a convolutional neural network can be employed to facilitate hand activity sensing. For example, a convolutional neural network for classification and/or detection can be employed to facilitate hand activity sensing. In certain embodiments, a convolutional neural network with convolutional layers, fully connected layers and/or max pooling layers can be employed to facilitate hand activity sensing. As such, accuracy of hand activity sensing across numerous different hand activities can be provided. Furthermore, accuracy of identification of unknown hand activities for hand activity sensing can be also be improved. Moreover, effectiveness of a machine learning model for activity sensing can be improved, performance of one or more processors that execute a machine learning model for activity sensing can be improved, and/or efficiency of one or more processors that execute a machine learning model for activity sensing can be improved.

Referring initially to FIG. 1, there is illustrated an example system 100 that facilitates hand activity sensing, according to one or more embodiments of the subject disclosure. The system 100 can be employed by various systems, such as, but not limited to activity sensing systems, activity recognition systems, wearable device systems, wrist-worn computational device systems, smartwatch systems, smartphone systems, accelerometer systems, signal processing systems, context-sensing systems, bio-acoustics systems, personal informatics systems, machine learning systems, artificial intelligence systems, convolutional neural network systems, modeling systems, cloud-based systems, and the like. Moreover, the system 100 and/or the components of the system 100 can be employed to use hardware and/or software to solve problems that are highly technical in nature (e.g., related to processing digital data, related to machine learning, etc.), that are not abstract and that cannot be performed as a set of mental acts by a human.

The system 100 can include a hand activity sensing component 102 that can include an inertial measurement unit (IMU) component 104 and a machine learning component 106. Aspects of the systems, apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. The system 100 (e.g., the hand activity sensing component 102) can include memory 110 for storing computer executable components and instructions. The system 100 (e.g., the hand activity sensing component 102) can further include a processor 108 to facilitate operation of the instructions (e.g., computer executable components and instructions) by the system 100 (e.g., the hand activity sensing component 102).

The hand activity sensing component 102 (e.g., the IMU component 104) can receive hand activity data 112. The hand activity data 112 can be associated with a sustained series of hand motor actions in performance of a human task. The series of hand motor actions related to the human task can occur during an interval of time that is, for example, greater than or equal to 2 seconds. For instance, the hand activity data 112 can include data associated with a sustained series of related hand motor actions, generally lasting a certain number of seconds or a certain number of minutes. The human task can be, for example, a hand activity. In an example, a single clap of the hand can be considered a hand motor action (e.g., a clapping action), whereas a series of claps of the hand can be considered a hand activity (e.g., an activity of clapping, a human task of clapping, etc.). The IMU component 104 can perform sensing with respect to a wrist-worn computational device (e.g., a smartwatch) to obtain the hand activity data 112. For instance, the IMU component 104 can capture gross orientation and/or movement of hands associated with a wrist-worn computational device (e.g., a smartwatch). In an embodiment, the IMU component 104 can obtain the hand activity data 112 from one or more accelerometers. For example, the IMU component 104 can obtain the hand activity data 112 from one or more accelerometers of a wrist-worn computational device (e.g., a smartwatch). Additionally or alternatively, the IMU component 104 can obtain the hand activity data 112 from one or more gyroscopes. For example, the IMU component 104 can additionally or alternatively obtain the hand activity data 112 from one or more gyroscopes of a wrist-worn computational device (e.g., a smartwatch). In an aspect, the IMU component 104 can employ a data window associated with a certain interval of time to obtain the hand activity data 112. For example, the IMU component 104 can employ a data window associated with an interval of time of 2 seconds or more to obtain the hand activity data 112. Additionally, in another aspect, the IMU component 104 can employ a sampling rate associated with a certain frequency to obtain the hand activity data 112. For example, the IMU component 104 can employ a sampling rate that comprises a frequency of 100 Hz or more to obtain the hand activity data 112.

The hand activity data 112 can include accelerometer data associated with accelerometer readings of one or more accelerometers of a wrist-worn computational device. In certain embodiments, the accelerometer data can be associated with one or more axis of one or more accelerometers of a wrist-worn computational device. For instance, the accelerometer data included in the hand activity data 112 can include X-axis data associated with an X-axis of an accelerometer, Y-axis data associated with a Y-axis of an accelerometer, and/or Z-axis data associated with a Z-axis of an accelerometer. Additionally or alternatively, the hand activity data 112 can include gyroscope data associated with gyroscope readings of one or more gyroscope of a wrist-worn computational device. In certain embodiments, the gyroscope data can be associated with one or more axis of one or more gyroscope of a wrist-worn computational device. For instance, the gyroscope data included in the hand activity data 112 can include X-axis data associated with an X-axis of an gyroscope, Y-axis data associated with a Y-axis of an gyroscope, and/or Z-axis data associated with a Z-axis of an gyroscope. In certain embodiments, the IMU component 104 can store the accelerometer data and/or the gyroscope data in one or more buffers (e.g., one or more circular buffers). For example, in an embodiment, the IMU component 104 can store the X-axis data associated with the accelerometer data and/or the gyroscope data in a first circular buffer, the IMU component 104 can store the Y-axis data associated with the accelerometer data and/or the gyroscope data in a second circular buffer, and/or the IMU component 104 can store the Z-axis data associated with the accelerometer data and/or the gyroscope data in a third circular buffer. In an example embodiment, the IMU component 104 can store the accelerometer data and/or the gyroscope data in one or more buffers (e.g., one or more circular buffers) at a sampling rate of 4 kHz. In an embodiment, the IMU component 104 can obtain at least a portion of the hand activity data 112 (e.g., at least a portion of the accelerometer data and/or the gyroscope data) from an inertial measurement unit of a wrist-worn computational device (e.g., a smartwatch). Additionally or alternatively, the hand activity data 112 can include bio-acoustic data. The bio-acoustic data included in the hand activity data 112 can be produced, for example, in response to one or more hand activities (e.g., typing, brushing teeth, etc.). For instance, the bio-acoustic data included in the hand activity data 112 can be body-coupled micro-vibrations that propagate through an arm of a user. In an aspect, the bio-acoustic data can include information related to one or more acoustic signals propagated through an arm of a user. In certain embodiments, the IMU component 104 can perform a fast Fourier transform (FFT) on the hand activity data 112 to transform the hand activity data 112 into a frequency domain. For example, the IMU component 104 can perform a FFT on the hand activity data 112 to generate a set of frequency bins associated with the hand activity data 112. In certain embodiments, the IMU component 104 can convert the hand activity data 112 into spectrogram data. For example, the IMU component 104 can convert the set of frequency bins associated with the hand activity data 112 into a spectrogram representing, for example, approximately 3 seconds or more of data. In certain embodiments, the IMU component 104 can generate first spectrogram data associated with the X-axis of the accelerometer and/or the gyroscope, second spectrogram data associated with the Y-axis of the accelerometer and/or the gyroscope, and third spectrogram data associated with the Z-axis of the accelerometer and/or the gyroscope.

The machine learning component 106 can extract and/or model one or more patterns associated with the hand activity data 112. For instance, the machine learning component 106 can identify one or more spatial-temporal relationships encoded in the hand activity data 112. In an aspect, the machine learning component 106 can determine classification data 114. The classification data 114 can be indicative of a classification for a hand activity associated with the hand activity data 112. For example, the machine learning component 106 can determine a classification for a human task associated with a series of hand motor actions sensed by a wrist-worn computational device. For example, the classification for the human task can include a classification associated with scrolling on a touchscreen of a mobile device, a classification associated with typing on a keyboard, a classification associated with using a mouse, a classification associated with tapping a touchscreen of a mobile device, a classification associated with playing piano, a classification associated with brushing hair, a classification associated with swaying, a classification associated with walking, a classification associated with writing with a pen, a classification associated with cutting with scissors, a classification associated with operating a tool, a classification associated with using a remote control, a classification associated with petting, a classification associated with clapping, a classification associated with scratching, a classification associated with opening a door, a classification associated with twisting a jar, a classification associated with pouring a pitcher, a classification associated with drinking, a classification associated with grating, a classification associated with chopping with a knife, a classification associated with washing utensils, a classification associated with washing hands, a classification associated with brushing teeth, and/or a classification associated with another type of human task. The machine learning component 106 can employ one or more machine learning techniques to determine the classification data 114. For example, the machine learning component 106 can employ a neural network to determine the classification data 114. In an embodiment, the machine learning component 106 can employ a convolutional neural network to determine the classification data 114. For instance, the convolutional neural network employed by the machine learning component 106 can include one or more convolutional units, one or more fully connected layers, one or more dropout layers and/or one or more softmax layers. Furthermore, in certain embodiments, the convolutional neural network employed by the machine learning component 106 can include a batch normalization layers between layers (e.g., non-linear layers) of the convolutional neural network. In an embodiment, a convolutional unit of the convolutional neural network employed by the machine learning component 106 can include one or more sublayers such as, for example, a convolutional operator layer, a batch normalization layer, a rectified linear unit activation layer, and/or a pooling layer. In certain embodiments, the convolutional neural network employed by the machine learning component 106 can include a dropout layer after a fully connected layer to mitigate overfitting. In a non-limiting example, the convolutional neural network employed by the machine learning component 106 can be a VGG16 convolutional neural network architecture with fully connected layers (e.g., 2000 and 500 nodes).

In an embodiment, the first spectrogram data associated with the X-axis of the accelerometer and/or the gyroscope, the second spectrogram data associated with the Y-axis of the accelerometer and/or the gyroscope, and/or the third spectrogram data associated with the Z-axis of the accelerometer and/or the gyroscope can be provided as input to the one or more machine learning techniques employed by the machine learning component 106. For example, a first input channel of a machine learning technique employed by the machine learning component 106 can receive the first spectrogram data associated with the X-axis of the accelerometer and/or the gyroscope, a second input channel of the machine learning technique employed by the machine learning component 106 can receive the second spectrogram data associated with the Y-axis of the accelerometer and/or the gyroscope, and/or a third input channel of the machine learning technique employed by the machine learning component 106 can receive the third spectrogram data associated with the Z-axis of the accelerometer and/or the gyroscope. As such, the one or more machine learning techniques employed by the machine learning component 106 can learn cross-axis relationships among the X-axis of the accelerometer and/or the gyroscope, the Y-axis of the accelerometer and/or the gyroscope, and/or the Z-axis of the accelerometer and/or the gyroscope. In certain embodiments, the first spectrogram data associated with the X-axis of the accelerometer and/or the gyroscope, the second spectrogram data associated with the Y-axis of the accelerometer and/or the gyroscope, and/or the third spectrogram data associated with the Z-axis of the accelerometer and/or the gyroscope can be provided as input to the convolutional neural network employed by the machine learning component 106. For example, a first input channel of the convolutional neural network employed by the machine learning component 106 can receive the first spectrogram data associated with the X-axis of the accelerometer and/or the gyroscope, a second input channel of the convolutional neural network employed by the machine learning component 106 can receive the second spectrogram data associated with the Y-axis of the accelerometer and/or the gyroscope, and/or a third input channel of the convolutional neural network employed by the machine learning component 106 can receive the third spectrogram data associated with the Z-axis of the accelerometer and/or the gyroscope. As such, the convolutional neural network employed by the machine learning component 106 can learn cross-axis relationships among the X-axis of the accelerometer and/or the gyroscope, the Y-axis of the accelerometer and/or the gyroscope, and/or the Z-axis of the accelerometer and/or the gyroscope.

In certain embodiments, the machine learning component 106 can extract information that is indicative of correlations, inferences and/or expressions from the hand activity data 112 based on the convolutional neural network associated with a network of convolutional layers. Additionally or alternatively, the machine learning component 106 can generate the classification data 114 based on the correlations, inferences and/or expressions. The machine learning component 106 can generate the classification data 114 based on the execution of at least one machine learning model associated with a network of convolutional layers. In an aspect, the machine learning component 106 can perform learning with respect to the hand activity data 112 explicitly or implicitly using a network of convolutional layers. The machine learning component 106 can also employ an automatic classification system and/or an automatic classification process to facilitate analysis of the hand activity data 112. For example, the machine learning component 106 can employ a probabilistic and/or statistical-based analysis (e.g., factoring into the analysis utilities and costs) to learn and/or generate inferences with respect to the hand activity data 112. The machine learning component 106 can employ, for example, a support vector machine (SVM) classifier to learn and/or generate inferences for the hand activity data 112. Additionally or alternatively, the machine learning component 106 can employ other classification techniques associated with Bayesian networks, decision trees and/or probabilistic classification models. Classifiers employed by the machine learning component 106 can be explicitly trained (e.g., via a generic training data) as well as implicitly trained (e.g., via receiving extrinsic information). For example, with respect to SVM's, SVM's can be configured via a learning or training phase within a classifier constructor and feature selection module. A classifier can be a function that maps an input attribute vector, x=(x1, x2, x3, x4, xn), to a confidence that the input belongs to a class—that is, f(x)=confidence (class). In certain embodiments, the machine learning component 106 can compare the hand activity data 112 to a list of hand activities to facilitate classification of the hand activity data 112. In certain embodiments, a custom label for a hand activity can be provided to the list of hand activities via a mobile device.

It is to be appreciated that technical features of the hand activity sensing component 102 (e.g., the IMU component 104 and/or the machine learning component 106) are highly technical in nature and not abstract ideas. Processing threads of the hand activity sensing component 102 (e.g., the IMU component 104 and/or the machine learning component 106) that process and/or analyze the hand activity data 112, perform a machine learning process, generate the classification data 114, etc. cannot be performed by a human (e.g., are greater than the capability of a single human mind). For example, the amount of the hand activity data 112 processed, the speed of processing of the hand activity data 112 and/or the data types of the hand activity sensing component 102 (e.g., the IMU component 104 and/or the machine learning component 106) over a certain period of time can be respectively greater, faster and different than the amount, speed and data type that can be processed by a single human mind over the same period of time. Furthermore, the hand activity data 112 processed by the hand activity sensing component 102 (e.g., the IMU component 104 and/or the machine learning component 106) can be digital data associated with one or more accelerometers. Moreover, the hand activity sensing component 102 (e.g., the IMU component 104 and/or the machine learning component 106) can be fully operational towards performing one or more other functions (e.g., fully powered on, fully executed, etc.) while also analyzing the hand activity data 112.

Figure 2:
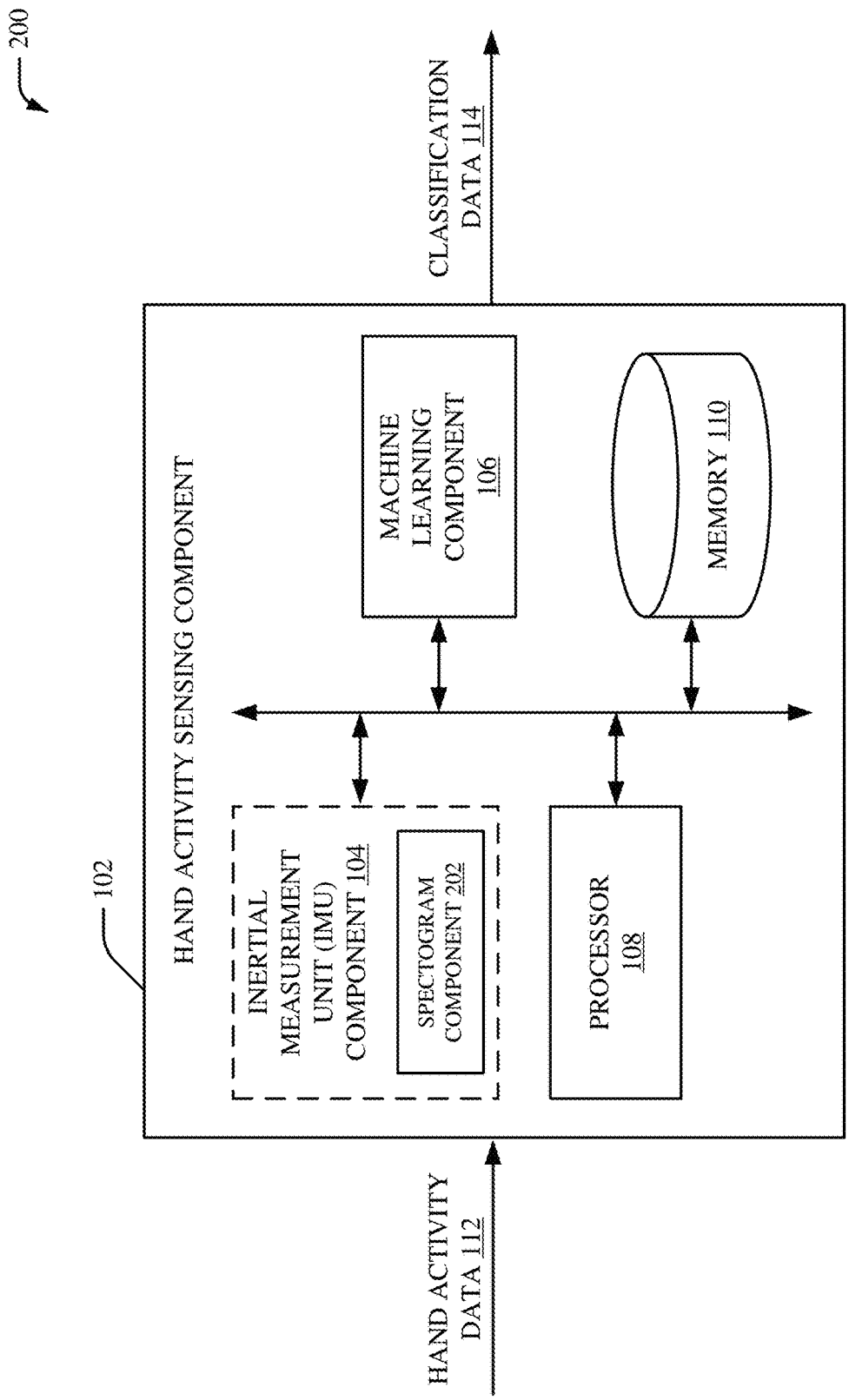
FIG. 2 illustrates a high-level block diagram of another example hand activity sensing component, in accordance with one or more embodiments described herein.

FIG. 2 illustrates an example, non-limiting system 200 in accordance with one or more embodiments described herein. Repetitive description of like elements employed in other embodiments described herein is omitted for sake of brevity. The system 200 includes the hand activity sensing component 102. The hand activity sensing component 102 can include the IMU component 104, the machine learning component 106, the processor 108 and/or the memory 110. In the embodiment shown in FIG. 2, the IMU component 104 can include a spectrogram component 202. The spectrogram component 202 can generate spectrogram data associated with the hand activity data 112. For example, the spectrogram component 202 can convert the hand activity data 112 into spectrogram data. The spectrogram data generated by the spectrogram component 202 can generate one or more spectrograms for one or more hand activities. For instance, a first spectrogram included in the spectrogram data can correspond to a first type of hand activity, a second spectrogram included in the spectrogram data can correspond to a second type of hand activity, etc. In an aspect, a spectrogram generated by the spectrogram component 202 can include data associated with a certain interval of time and a certain frequency range. In another aspect, a spectrogram generated by the spectrogram component 202 can include a data pattern associated with different degrees of spectral power. In an embodiment, the spectrogram component 202 can convert the set of frequency bins associated with the hand activity data 112 into a spectrogram representing, for example, approximately 3 seconds or more of data. In certain embodiments, the spectrogram component 202 can generate first spectrogram data associated with an X-axis of an accelerometer included in a wrist-worn computational device, second spectrogram data associated with a Y-axis of the accelerometer, and third spectrogram data associated with a Z-axis of the accelerometer. Additionally or alternatively, the spectrogram component 202 can generate first spectrogram data associated with an X-axis of a gyroscope included in a wrist-worn computational device, second spectrogram data associated with a Y-axis of the gyroscope, and third spectrogram data associated with a Z-axis of the gyroscope.

Figure 3:
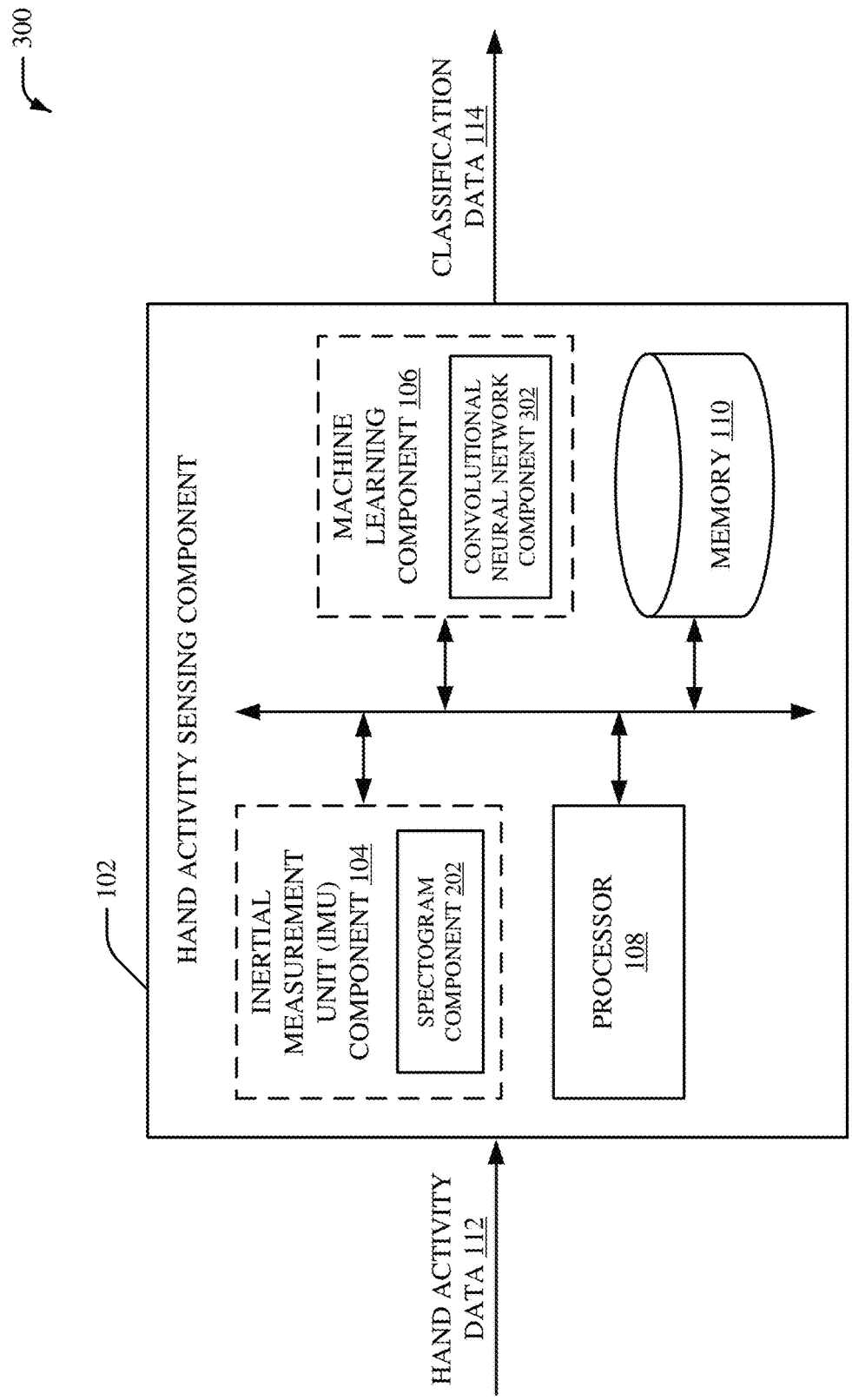
FIG. 3 illustrates a high-level block diagram of yet another example hand activity sensing component, in accordance with one or more embodiments described herein.

FIG. 3 illustrates an example, non-limiting system 300 in accordance with one or more embodiments described herein. Repetitive description of like elements employed in other embodiments described herein is omitted for sake of brevity. The system 300 includes the hand activity sensing component 102. The hand activity sensing component 102 can include the IMU component 104, the machine learning component 106, the processor 108 and/or the memory 110. In the embodiment shown in FIG. 3, the IMU component 104 can include the spectrogram component 202. Additionally, the machine learning component 106 can include a convolutional neural network component 302. The convolutional neural network component 302 can execute and/or manage a convolutional neural network to determine classification data 114. The classification data 114 can include a classification for one or more spatial-temporal relationships associated with the hand activity data 112. For instance, the classification data 114 can include a classification for one or more hand activities associated with the hand activity data 112. The convolutional neural network executed and/or managed by the convolutional neural network component 302 can include one or more convolutional units, one or more fully connected layers, one or more dropout layers and/or one or more softmax layers. Furthermore, in certain embodiments, the convolutional neural network executed and/or managed by the convolutional neural network component 302 can include a batch normalization layers between layers (e.g., non-linear layers) of the convolutional neural network. In an embodiment, a convolutional unit of the convolutional neural network executed and/or managed by the convolutional neural network component 302 can include one or more sublayers such as, for example, a convolutional operator layer, a batch normalization layer, a rectified linear unit activation layer, and/or a pooling layer. In certain embodiments, the convolutional neural network executed and/or managed by the convolutional neural network component 302 can include a dropout layer after a fully connected layer to mitigate overfitting. In a non-limiting example, the convolutional neural network executed and/or managed by the convolutional neural network component 302 can be a VGG16 convolutional neural network architecture with fully connected layers (e.g., 2000 and 500 nodes). In an embodiment, the first spectrogram data associated with the X-axis of the accelerometer, the second spectrogram data associated with the Y-axis of the accelerometer, and/or the third spectrogram data associated with the Z-axis of the accelerometer can be provided as input to the convolutional neural network executed and/or managed by the convolutional neural network component 302. For example, a first input channel of the convolutional neural network executed and/or managed by the convolutional neural network component 302 can receive the first spectrogram data associated with the X-axis of the accelerometer, a second input channel of the convolutional neural network executed and/or managed by the convolutional neural network component 302 can receive the second spectrogram data associated with the Y-axis of the accelerometer, and/or a third input channel of the convolutional neural network executed and/or managed by the convolutional neural network component 302 can receive the third spectrogram data associated with the Z-axis of the accelerometer. As such, the convolutional neural network executed and/or managed by the convolutional neural network component 302 can learn cross-axis relationships among the X-axis of the accelerometer, the Y-axis of the accelerometer, and/or the Z-axis of the accelerometer. Additionally or alternatively, the first spectrogram data associated with the X-axis of the gyroscope, the second spectrogram data associated with the Y-axis of the gyroscope, and/or the third spectrogram data associated with the Z-axis of the gyroscope can be provided as input to the convolutional neural network executed and/or managed by the convolutional neural network component 302. For example, a first input channel of the convolutional neural network executed and/or managed by the convolutional neural network component 302 can additionally or alternatively receive the first spectrogram data associated with the X-axis of the gyroscope, a second input channel of the convolutional neural network executed and/or managed by the convolutional neural network component 302 can additionally or alternatively receive the second spectrogram data associated with the Y-axis of the gyroscope, and/or a third input channel of the convolutional neural network executed and/or managed by the convolutional neural network component 302 can additionally or alternatively receive the third spectrogram data associated with the Z-axis of the gyroscope. As such, the convolutional neural network executed and/or managed by the convolutional neural network component 302 can additionally or alternatively learn cross-axis relationships among the X-axis of the gyroscope, the Y-axis of the gyroscope, and/or the Z-axis of the gyroscope.

In certain embodiments, the convolutional neural network component 302 can extract information that is indicative of correlations, inferences and/or expressions from the hand activity data 112 based on the convolutional neural network executed and/or managed by the convolutional neural network component 302 Additionally or alternatively, the convolutional neural network component 302 can generate the classification data 114 based on the correlations, inferences and/or expressions. The convolutional neural network component 302 can generate the classification data 114 based on the execution of at least one machine learning model executed and/or managed by the convolutional neural network component 302. In an aspect, the convolutional neural network component 302 can perform learning with respect to the hand activity data 112 explicitly or implicitly using a network of convolutional layers. The convolutional neural network component 302 can also employ an automatic classification system and/or an automatic classification process to facilitate analysis of the hand activity data 112. For example, the convolutional neural network component 302 can employ a probabilistic and/or statistical-based analysis (e.g., factoring into the analysis utilities and costs) to learn and/or generate inferences with respect to the hand activity data 112. The convolutional neural network component 302 can employ, for example, a SVM classifier to learn and/or generate inferences for the hand activity data 112. Additionally or alternatively, the convolutional neural network component 302 can employ other classification techniques associated with Bayesian networks, decision trees and/or probabilistic classification models. Classifiers employed by the convolutional neural network component 302 can be explicitly trained (e.g., via a generic training data) as well as implicitly trained (e.g., via receiving extrinsic information). For example, with respect to SVM's, SVM's can be configured via a learning or training phase within a classifier constructor and feature selection module. A classifier can be a function that maps an input attribute vector, x=(x1, x2, x3, x4, xn), to a confidence that the input belongs to a class— that is, f(x)=confidence(class).

Figure 4:
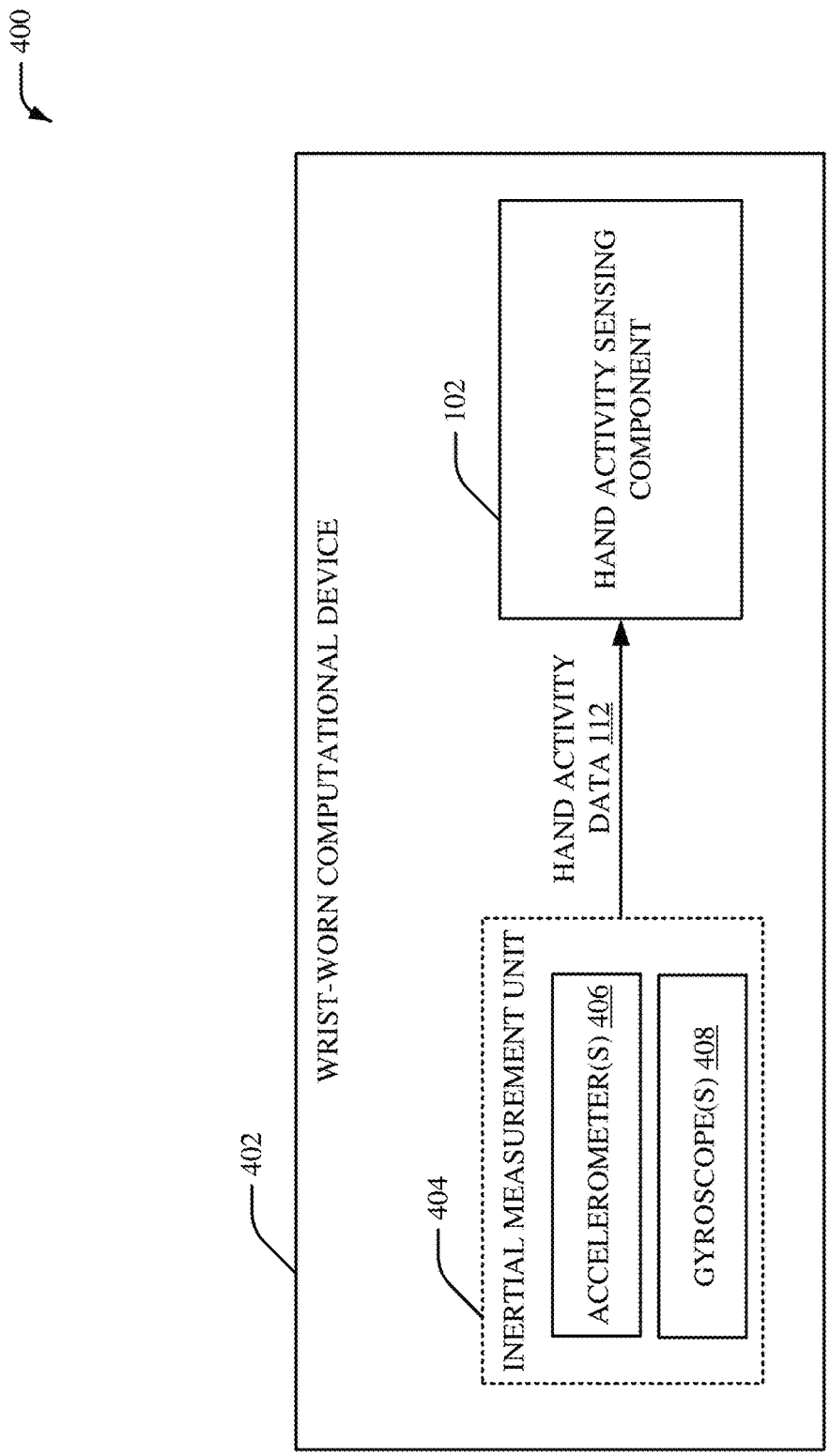
FIG. 4 illustrates an example system that includes a wrist-worn computational device, in accordance with one or more embodiments described herein.

FIG. 4 illustrates an example, non-limiting system 400 in accordance with one or more embodiments described herein. Repetitive description of like elements employed in other embodiments described herein is omitted for sake of brevity. The system 400 includes a wrist-worn computational device 402. The wrist-worn computational device 402 can be, for example, a computational device worn on a wrist of a human (e.g., a user). In an embodiment, the wrist-worn computational device 402 can be a smartwatch. The wrist-worn computational device 402 can include the hand activity sensing component 102. The hand activity sensing component 102 can include the IMU component 104, the machine learning component 106, the processor 108 and/or the memory 110. In an embodiment, the IMU component 104 can include the spectrogram component 202. Additionally or alternatively, the machine learning component 106 can include the convolutional neural network component 302. The wrist-worn computational device 402 can also include an inertial measurement unit 404. The inertial measurement unit 404 can include at least one or more accelerometers 406 and/or one or more gyroscopes 408. The inertial measurement unit 404 can be in communication with the hand activity sensing component 102. In an aspect, the inertial measurement unit 404 can provide the hand activity data 112 to the hand activity sensing component 102. In an embodiment, the one or more accelerometers 406 can additionally or alternatively be in communication with the hand activity sensing component 102 to provide the hand activity data 112 to the hand activity sensing component 102. In certain embodiments, the inertial measurement unit 404 can provide X-axis data associated with the one or more accelerometers 406, Y-axis data associated with the one or more accelerometers 406, and/or Z-axis data associated with the one or more accelerometers 406 to the hand activity sensing component 102 via the hand activity data 112. Additionally or alternatively, the one or more gyroscopes 408 can additionally or alternatively be in communication with the hand activity sensing component 102 to provide the hand activity data 112 to the hand activity sensing component 102. In certain embodiments, the inertial measurement unit 404 can provide X-axis data associated with the one or more gyroscopes 408, Y-axis data associated with the one or more gyroscopes 408, and/or Z-axis data associated with the one or more gyroscopes 408 to the hand activity sensing component 102 via the hand activity data 112. Additionally or alternatively, the inertial measurement unit 404 can provide bio-acoustic data to the hand activity sensing component 102 via the hand activity data 112. In certain embodiments, a portion of the hand activity sensing component 102 (e.g., the IMU component 104, the machine learning component 106, the spectrogram component 202, and/or the convolutional neural network component 302) can additionally or alternatively be implemented on a server. In certain embodiments, a portion of the hand activity sensing component 102 (e.g., the IMU component 104, the machine learning component 106, the spectrogram component 202, and/or the convolutional neural network component 302) can additionally or alternatively be implemented on a mobile device (e.g., a smartphone, a tablet device, etc.).

Figure 5:
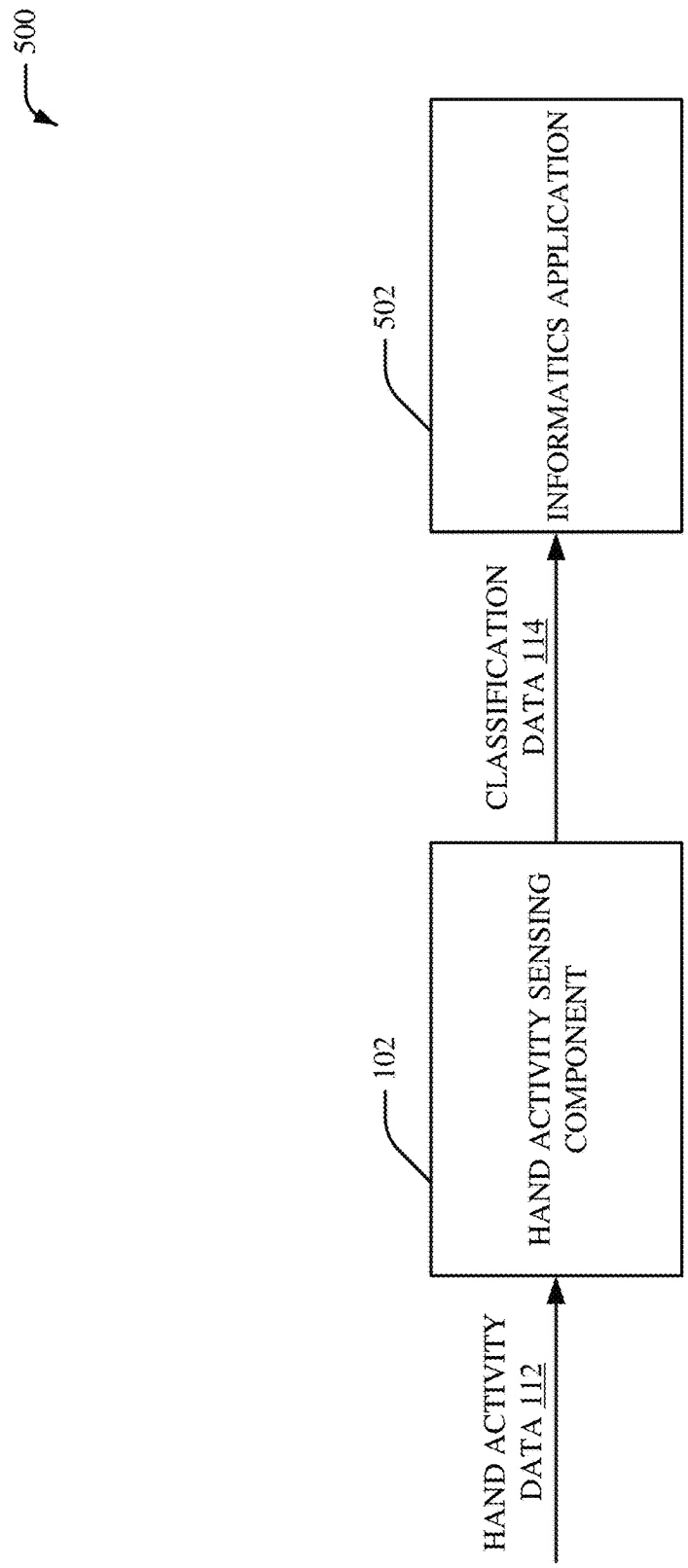
FIG. 5 illustrates an example system that includes a hand activity sensing component and an informatics application, in accordance with one or more embodiments described herein.

FIG. 5 illustrates an example, non-limiting system 500 in accordance with one or more embodiments described herein. Repetitive description of like elements employed in other embodiments described herein is omitted for sake of brevity. The system 500 includes the hand activity sensing component 102 and an informatics application 502. The hand activity sensing component 102 can include the IMU component 104, the machine learning component 106, the processor 108 and/or the memory 110. In an embodiment, the IMU component 104 can include the spectrogram component 202. Additionally or alternatively, the machine learning component 106 can include the convolutional neural network component 302. The hand activity sensing component 102 can generate the classification data 114 based on the hand activity data 112. Furthermore, in an embodiment, the hand activity sensing component 102 can provide the classification data 114 to the informatics application 502. For instance, the informatics application 502 can employ the classification data 114 to perform and/or initiate one or more actions related to informatics. In an embodiment, the informatics application 502 can employ the classification data 114 to initiate one or more actions via a wrist-worn computational device (e.g., the wrist-worn computational device 402). In certain embodiments, the informatics application 502 can employ the classification data 114 to generate an alert (e.g., an electronic message) via a display of a wrist-worn computational device (e.g., the wrist-worn computational device 402) associated with the hand activity data 112. In certain embodiments, the informatics application 502 can employ the classification data 114 to additionally or alternatively generate an alert (e.g., an electronic message) via a display of a mobile device (e.g., a smartphone) in communication with a wrist-worn computational device (e.g., the wrist-worn computational device 402) associated with the hand activity data 112. In certain embodiments, the informatics application 502 can employ the classification data 114 to generate to alter one or more settings and/or one or more configurations of a wrist-worn computational device (e.g., the wrist-worn computational device 402) associated with the hand activity data 112. The informatics application 502 can be, for example, a personal informatics application, a fitness informatics application, a health-related application, a health assessment application, a healthcare monitoring application, an automatic skill assessment application, a context-awareness application, and/or one or more other applications. In one example, the informatics application 502 can employ the classification data 114 to track typing behavior of a user that wears a wrist-worn computational device (e.g., the wrist-worn computational device 402) to prevent, for example, repetitive strain injury (RSI) to the user. In another example, the informatics application 502 can employ the classification data 114 to track a smoking habit of a user that wears a wrist-worn computational device (e.g., the wrist-worn computational device 402) as part of a cessation regime for the user to stop the smoking habit. In yet another example, the informatics application 502 can employ the classification data 114 to tool use of a user that wears a wrist-worn computational device (e.g., the wrist-worn computational device 402) to, for example, prevent handarm vibration syndrome (HAYS) for the user. Eldercare monitoring systems [18, 55, 64] could also make use of this new and nuanced information source. In yet another example, the informatics application 502 can employ the classification data 114 for a health monitoring system. In yet another example, the informatics application 502 can employ the classification data 114 for skill-level evaluation associated with musical skill acquisition, sports performance, and/or health rehabilitation. In yet another example, the informatics application 502 can employ the classification data 114 to detect skill degradation and/or onset of motor impairment such as, for example, hand tremors and Parkinson's disease. However, it is to be appreciated that the informatics application 502 can employ the classification data 114 for another type of application.

Figure 6:
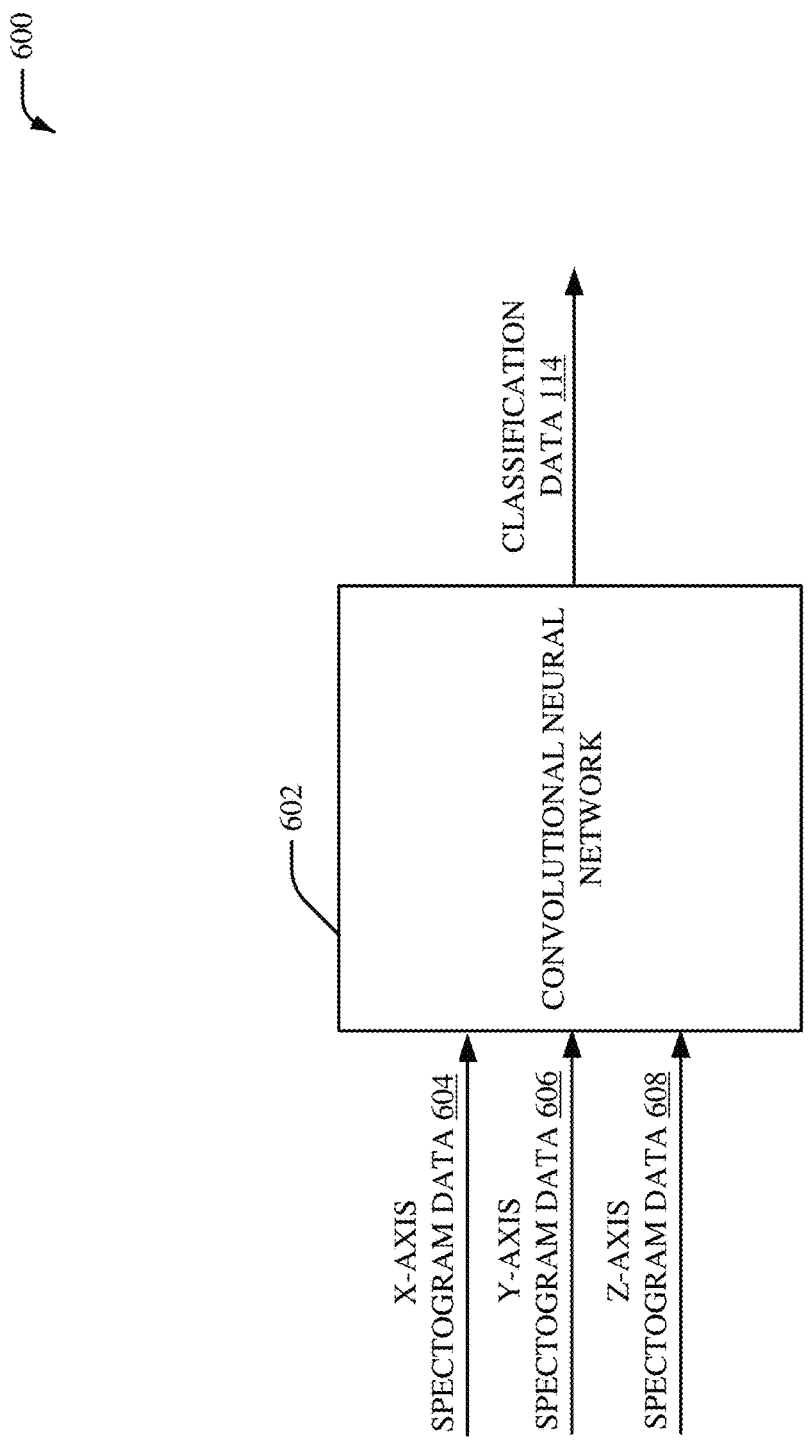
FIG. 6 illustrates an example system associated with a convolutional neural network, in accordance with one or more embodiments described herein.

FIG. 6 illustrates an example, non-limiting system 600 in accordance with one or more embodiments described herein. Repetitive description of like elements employed in other embodiments described herein is omitted for sake of brevity. The system 600 includes a convolutional neural network 602. The convolutional neural network 602 can generate the classification data 114 based on X-axis spectrogram data 604, Y-axis spectrogram data 606 and/or Z-axis spectrogram data 608. The convolutional neural network 602 can be, for example, a convolutional neural network employed by the machine learning component 106. In another example, the convolutional neural network 602 can be a convolutional neural network employed by the convolutional neural network component 302. The convolutional neural network 602 can perform deep learning via one or more convolutional layers. In an embodiment, the convolutional neural network 602 can include one or more convolutional units, one or more fully connected layers, one or more dropout layers and/or one or more softmax layers. Furthermore, in certain embodiments, the convolutional neural network 602 can include a batch normalization layers between layers (e.g., non-linear layers) of the convolutional neural network. In an embodiment, a convolutional unit of the convolutional neural network 602 can include one or more sublayers such as, for example, a convolutional operator layer, a batch normalization layer, a rectified linear unit activation layer, and/or a pooling layer. In certain embodiments, the convolutional neural network 602 can include a dropout layer after a fully connected layer to mitigate overfitting. In a non-limiting example, the convolutional neural network 602 can be a VGG16 convolutional neural network architecture with fully connected layers (e.g., 2000 and 500 nodes).

In another embodiment, the X-axis spectrogram data 604, the Y-axis spectrogram data 606 and/or the Z-axis spectrogram data 608 can be provided as input to the convolutional neural network 602. For example, a first input channel of the convolutional neural network 602 can receive the X-axis spectrogram data 604, a second input channel of the convolutional neural network 602 can receive the Y-axis spectrogram data 606, and/or a third input channel of the convolutional neural network 602 can receive the the Z-axis spectrogram data 608. The X-axis spectrogram data 604 can include, for example, a spectrogram associated with an X-axis of an accelerometer. For instance, the X-axis spectrogram data 604 can include a spectrogram associated with an X-axis of the one or more accelerometers 406. The spectrogram associated with the X-axis spectrogram data 604 can include, for example, a pattern of spectral power levels obtained by the X-axis of the accelerometer during a certain period of time. The Y-axis spectrogram data 606 can include, for example, a spectrogram associated with an Y-axis of an accelerometer. For instance, the Y-axis spectrogram data 606 can include a spectrogram associated with a Y-axis of the one or more accelerometers 406. The spectrogram associated with the Y-axis spectrogram data 606 can include, for example, a pattern of spectral power levels obtained by the Y-axis of the accelerometer during a certain period of time. The Z-axis spectrogram data 608 can include, for example, a spectrogram associated with an Z-axis of an accelerometer. For instance, the Z-axis spectrogram data 608 can include a spectrogram associated with a Z-axis of the one or more accelerometers 406. The spectrogram associated with the Z-axis spectrogram data 608 can include, for example, a pattern of spectral power levels obtained by the Z-axis of the accelerometer during a certain period of time.

Additionally or alternatively, the X-axis spectrogram data 604 can include, for example, a spectrogram associated with an X-axis of gyroscope. For instance, the X-axis spectrogram data 604 can additionally or alternatively include a spectrogram associated with an X-axis of the one or more gyroscopes 408. The spectrogram associated with the X-axis spectrogram data 604 can additionally or alternatively include, for example, a pattern of spectral power levels obtained by the X-axis of the gyroscope during a certain period of time. The Y-axis spectrogram data 606 can additionally or alternatively include, for example, a spectrogram associated with an Y-axis of an gyroscope. For instance, the Y-axis spectrogram data 606 can additionally or alternatively include a spectrogram associated with a Y-axis of the one or more gyroscopes 408. The spectrogram associated with the Y-axis spectrogram data 606 can additionally or alternatively include, for example, a pattern of spectral power levels obtained by the Y-axis of the gyroscope during a certain period of time. The Z-axis spectrogram data 608 can additionally or alternatively include, for example, a spectrogram associated with an Z-axis of a gyroscope. For instance, the Z-axis spectrogram data 608 can additionally or alternatively include a spectrogram associated with a Z-axis of the one or more gyroscopes 408. The spectrogram associated with the Z-axis spectrogram data 608 can additionally or alternatively include, for example, a pattern of spectral power levels obtained by the Z-axis of the gyroscope during a certain period of time.

Figure 7:
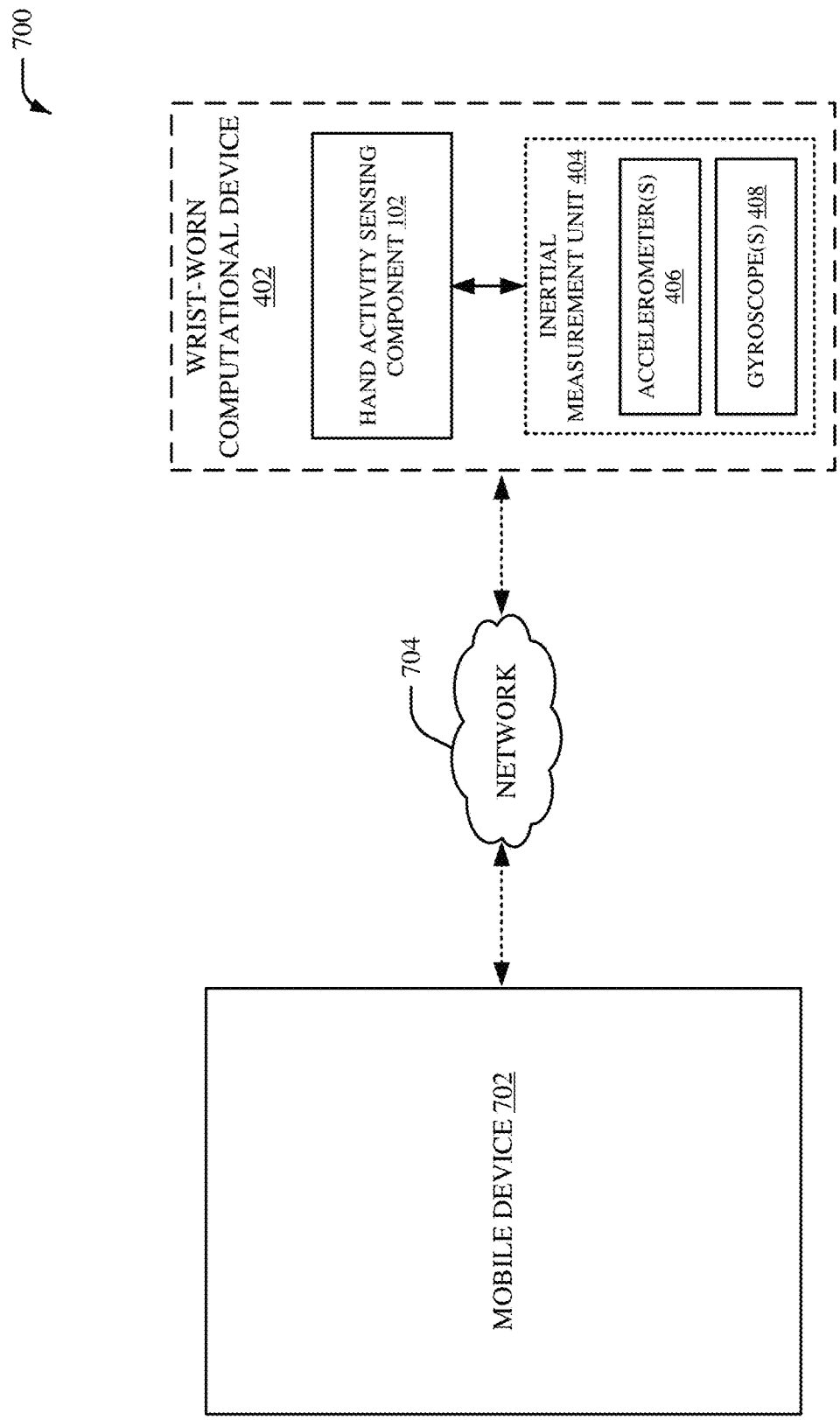
FIG. 7 illustrates an example system associated with a mobile device and a wrist-worn computational device, in accordance with one or more embodiments described herein.

FIG. 7 illustrates an example, non-limiting system 700 in accordance with one or more embodiments described herein. Repetitive description of like elements employed in other embodiments described herein is omitted for sake of brevity. The system 700 includes the wrist-worn computational device 402. The wrist-worn computational device 402 can include the hand activity sensing component 102 and/or the inertial measurement unit 404. The inertial measurement unit 404 can include, for example, the one or more accelerometers 406 and/or the one or more gyroscopes 408. The hand activity sensing component 102 can include the IMU component 104, the machine learning component 106, the processor 108 and/or the memory 110. In an embodiment, the IMU component 104 can include the spectrogram component 202. Additionally or alternatively, the machine learning component 106 can include the convolutional neural network component 302. The system 700 also includes a mobile device 702. The mobile device 702 can be in communication with the wrist-worn computational device 402 via a network 704. The mobile device 702 can be, for example, a mobile phone, a smartphone, a tablet device and/or another type of mobile device. The network 704 can be a wireless communication network. In an embodiment, the network can be a wireless communication network that employs short-wavelength ultra high frequency (UHF) radio waves to communicate between the mobile device 702 and the wrist-worn computational device 402. However, it is to be appreciated that the network 704 can employ a different type of communication protocol to facilitate communication between the mobile device 702 and the wrist-worn computational device 402. In an embodiment, the wrist-worn computational device 402 can provide the classification data 114 and/or information associated with the classification data 114 to the mobile device 702. For example, an alert (e.g., an electronic message) associated with the classification data 114 generated by the hand activity sensing component 102 can be presented via a display of the mobile device 702. In certain embodiments, the mobile device 702 can include an informatics application (e.g., the informatics application 502) that can employ the classification data generated by the hand activity sensing component 102. In certain embodiments, a portion of the hand activity sensing component 102 (e.g., the IMU component 104, the machine learning component 106, the spectrogram component 202, and/or the convolutional neural network component 302) can additionally or alternatively be implemented on the mobile device 702. In certain embodiments, a custom classification (e.g., a custom label) for a particular hand activity associated with the wrist-worn computational device 402 can be provided to hand activity sensing component 102 via the mobile device 702 to facilitate future classification of hand activity data. For example, a custom classification (e.g., a custom label) for a particular hand activity associated with the wrist-worn computational device 402 can be added to a list of hand activities via the mobile device 702 to facilitate classification of the hand activity data 112 by the hand activity sensing component 102 (e.g., by the machine learning component 106 of the hand activity sensing component 102).

Figure 8:
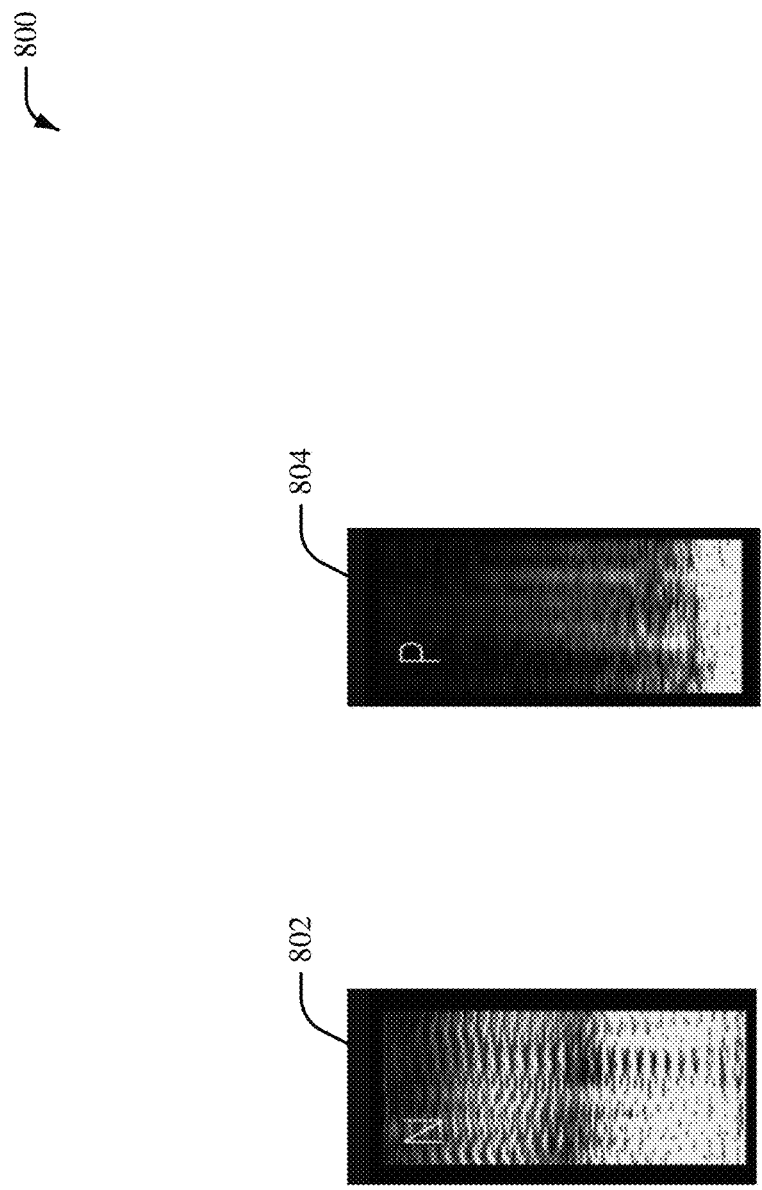
FIG. 8 illustrates an example system associated with example spectrograms, in accordance with one or more embodiments described herein.

FIG. 8 illustrates an example, non-limiting system 800 in accordance with one or more embodiments described herein. Repetitive description of like elements employed in other embodiments described herein is omitted for sake of brevity. The system 800 includes an example spectrogram 802 and an example spectrogram 804. The spectrogram 802 and the spectrogram 804 can be, for example, spectrograms generated by the spectrogram component 202. The spectrogram 802 can be associated with a first type of hand activity (e.g., a first human task) and the spectrogram 802 can be associated with a second type of hand activity (e.g., a second human task). Furthermore, the spectrogram 802 can be associated with a first data pattern of spectral power. For instance, the spectrogram 802 can be associated with a first distribution of spectral power that corresponds to the first type of hand activity. Additionally, the spectrogram 804 can be associated with a second data pattern of spectral power that is different than the first data pattern of spectral power associated with the spectrogram 802. For instance, the spectrogram 804 can be associated with a second distribution of spectral power that corresponds to the second type of hand activity. The first type of hand activity can be a hand activity such as, for example, scrolling on a touchscreen of a mobile device (e.g., the mobile device 702), typing on a keyboard, using a mouse, tapping a touchscreen of a mobile device (e.g., the mobile device 702), playing piano, brushing hair, swaying, walking, writing with a pen, cutting with scissors, operating a tool, using a remote control, petting, clapping, scratching, opening a door, twisting a jar, pouring a pitcher, drinking, grating, chopping with a knife, washing utensils, washing hands, brushing teeth, and/or another type of hand activity. Similarly, the second type of hand activity can be a hand activity such as, for example, scrolling on a touchscreen of a mobile device (e.g., the mobile device 702), typing on a keyboard, using a mouse, tapping a touchscreen of a mobile device (e.g., the mobile device 702), playing piano, brushing hair, swaying, walking, writing with a pen, cutting with scissors, operating a tool, using a remote control, petting, clapping, scratching, opening a door, twisting ajar, pouring a pitcher, drinking, grating, chopping with a knife, washing utensils, washing hands, brushing teeth, and/or another type of hand activity.

Figure 9:
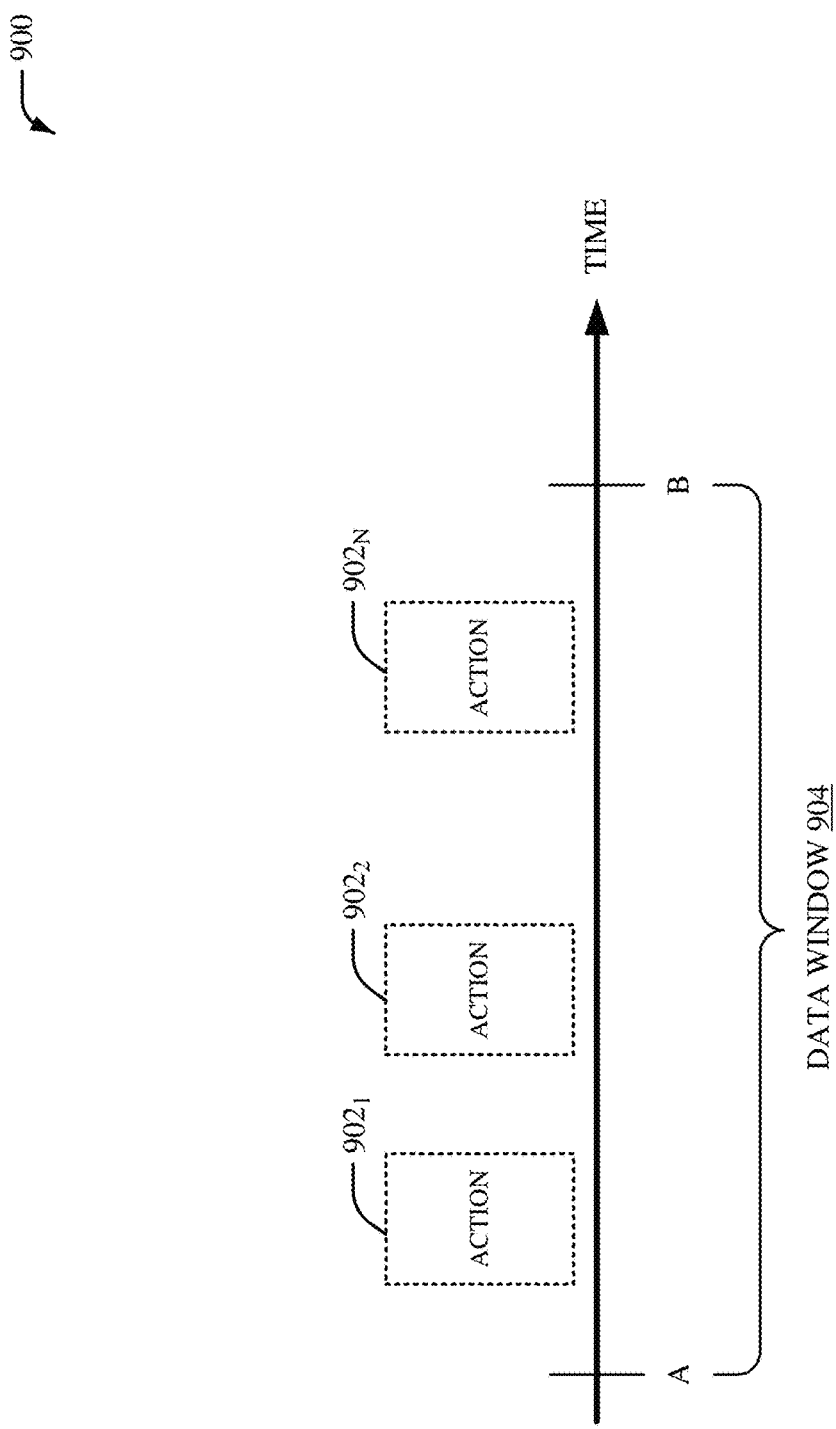
FIG. 9 illustrates an example system associated with a set of actions, in accordance with one or more embodiments described herein.

FIG. 9 illustrates an example, non-limiting system 900 in accordance with one or more embodiments described herein. Repetitive description of like elements employed in other embodiments described herein is omitted for sake of brevity. The system 900 includes a set of actions $902_{1-N}$, where N is an integer. As an example, the set of actions $902_{1-N}$ can include an action $902_1$, an action $902_2$ and an action $902_N$. The set of actions $902_{1-N}$ can be a sustained series of hand motor actions in performance of a human task. For example, the set of actions $902_{1-N}$ can be a series of actions performed by a human hand in a sustained manner in performance of a human task. The human task can be a hand activity. In an example, the human task can be washing hands, cleaning dishes, playing piano, etc. Furthermore, the set of actions $902_{1-N}$ can correspond to a set of hand activities. For instance, the action $902_1$ can correspond to a first hand action (e.g., a first hand motor action), the action $902_2$ can correspond to a second hand action (e.g., a second hand motor action), and the action $902_N$ can correspond to an Nth hand action (e.g., an Nth hand motor action). In an aspect, the set of actions $902_{1-N}$ can occur during a data window 904. For instance, at least a portion of the hand activity data 112 can correspond to data associated with the set of actions $902_{1-N}$. Furthermore, the data associated with the set of actions $902_{1-N}$ can be captured by the IMU component 104 during the data window 904. The data window 904 can be a data window employed by the IMU component 104 to obtain the hand activity data 112. For instance, the data window 904 can be a data window employed by the IMU component 104 to obtain data associated with the set of actions $902_{1-N}$. In an embodiment, an interval of time associated with the data window 904 can be 2 seconds or more. For example, an interval of time from A to B in FIG. 9 can be 2 seconds or more. In another embodiment, an interval of time associated with the data window 904 can be 5 seconds or more. For example, an interval of time from A to B in FIG. 9 can be 5 seconds or more. However, it is to be appreciated that an interval of time associated with the data window 904 can be a different interval of time to allow an adequate amount of data to classify a task associated with the set of actions $902_{1-N}$. An action from the set of actions $902_{1-N}$ can be, for example, an approximately instantaneous event that, combination with one or more other actions, correspond to an activity. In a non-limiting example, the action $902_1$ can correspond to poking food with a fork, the action $902_2$ can correspond to placing food in a mouth of a user, and the action $902_N$ can correspond to wiping a mouth of a user with a napkin such that the set of actions $902_{1-N}$ correspond to an activity (e.g., a task) of eating dinner. In another non-limiting example, the action $902_1$ can correspond to turning on a sink faucet, the action $902_2$ can correspond to placing soap on hands of a user, and the action $902_N$ can correspond to placing the hands of the user under water coming from the faucet such that the set of actions $902_{1-N}$ correspond to a task (e.g., a hand activity) of washing hands.

Figure 10:
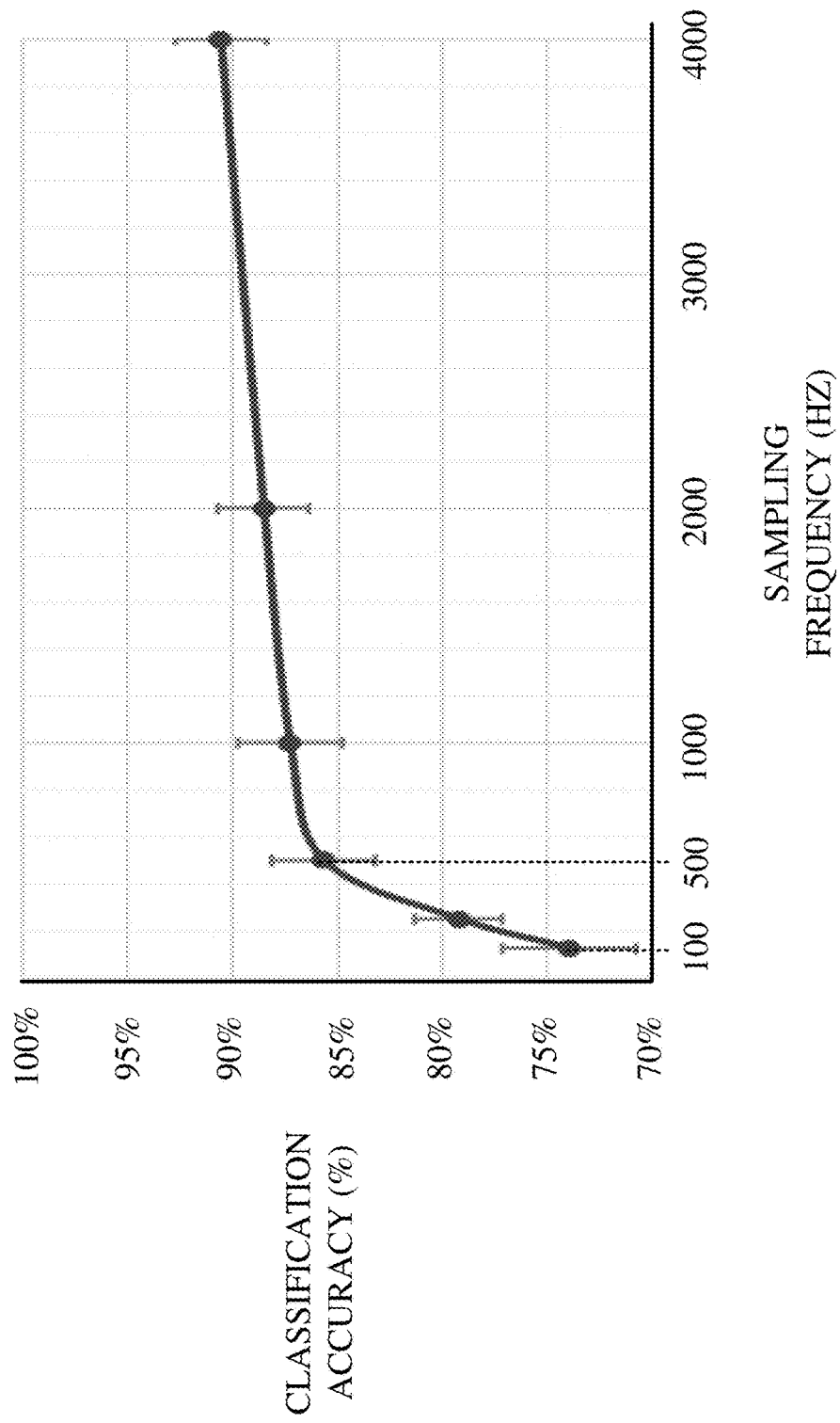
FIG. 10 illustrates an example graph that compares sampling frequency and classification accuracy, in accordance with one or more embodiments described herein.

FIG. 10 illustrates an example, non-limiting graph 1000 in accordance with one or more embodiments described herein. Repetitive description of like elements employed in other embodiments described herein is omitted for sake of brevity. The graph 1000 provides analysis of sampling frequency (Hz) vs. classification accuracy (%). For example, the graph 1000 can illustrate classification accuracy (%) of the classification data 114 provided by the hand activity sensing component 102 (e.g., by the machine learning component 106 of the hand activity sensing component 102) based on a sampling frequency (Hz) employed by the hand activity sensing component 102 (e.g., by the IMU component 104 of the hand activity sensing component 102) to obtain the hand activity data 112. As shown in the graph 1000, the hand activity sensing component 102 (e.g., by the IMU component 104 of the hand activity sensing component 102) can employ a sampling frequency of 100 Hz or more to obtain the hand activity data 112 and to provide accurate classification of the hand activity data 112. Furthermore, as shown in the graph 1000, the hand activity sensing component 102 (e.g., by the IMU component 104 of the hand activity sensing component 102) can employ a sampling frequency of 500 Hz or more to obtain the hand activity data 112 and to provide optimal classification accuracy for the hand activity data 112.

Figure 11:
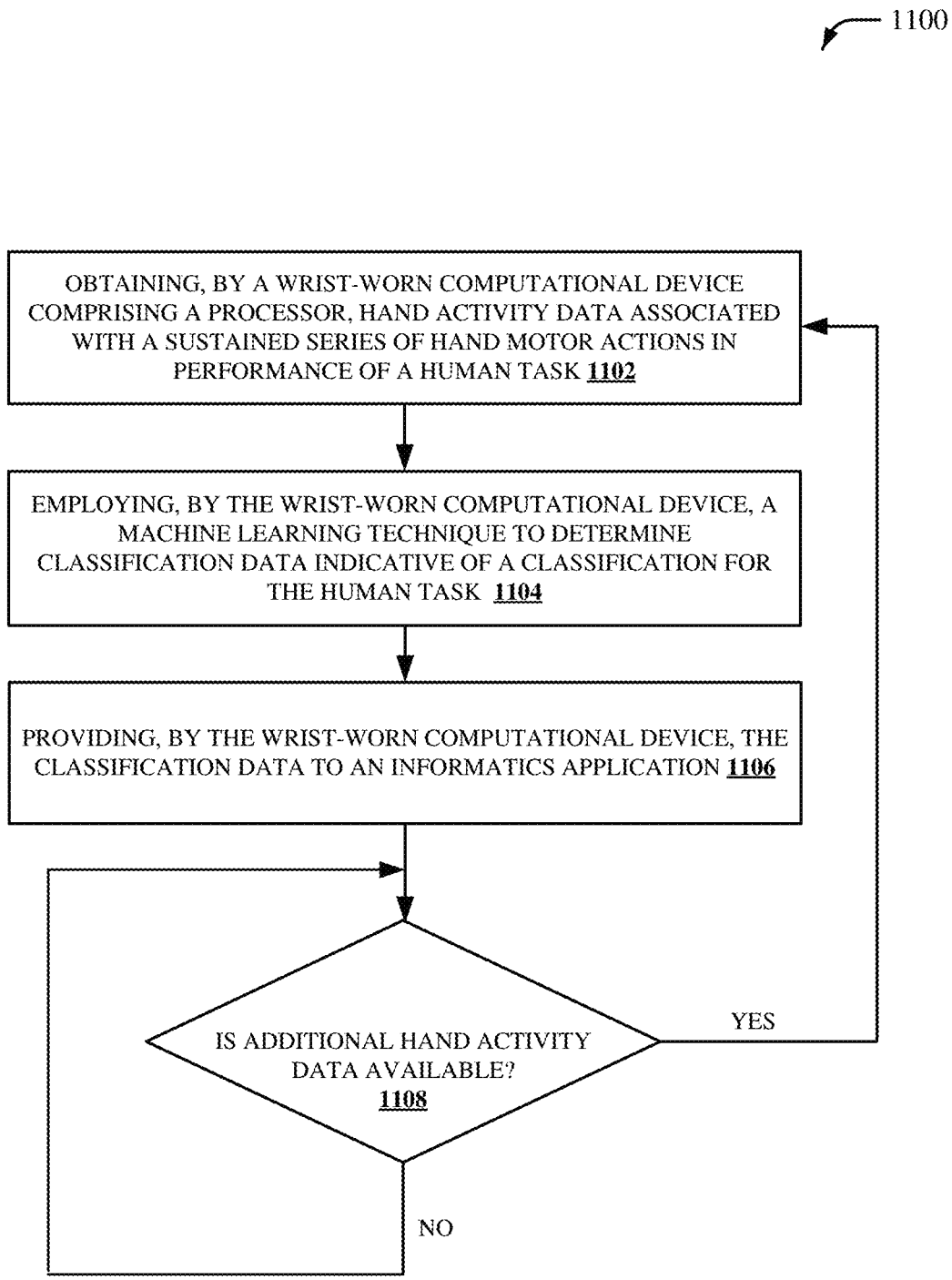
FIG. 11 depicts a flow diagram of an example method for facilitating hand activity sensing, in accordance with one or more embodiments described herein.

FIG. 11 illustrates a flow diagram of an example, non-limiting computer-implemented method 1100 for hand activity sensing in accordance with one or more embodiments described herein. Repetitive description of like elements employed in other embodiments described herein is omitted for sake of brevity. At 1102, obtaining, by a wrist-worn computational device comprising a processor, hand activity data associated with a sustained series of hand motor actions in performance of a human task. The wrist-worn computational device can be, for example, a smartwatch. The series of hand motor actions related to the human task can occur during an interval of time that is, for example, greater than or equal to 2 seconds. For instance, the hand activity data can include data associated with a sustained series of related hand actions, generally lasting a certain number of seconds or a certain number of minutes. In an aspect, sensing can be performed with respect to the wrist-worn computational device to obtain the hand activity data. For instance, gross orientation and/or movement of hands associated with the wrist-worn computational device can be captured. In an embodiment, the hand activity data can be obtained from one or more accelerometers. For example, the hand activity data can be obtained from one or more accelerometers of the wrist-worn computational device. Additionally or alternatively, the hand activity data can be obtained from one or more gyroscopes. For example, the hand activity data can be obtained from one or more gyroscopes of the wrist-worn computational device. In an aspect, a data window associated with a certain interval of time can be employed to obtain the hand activity data. For example, a data window associated with an interval of time of 2 seconds or more can be employed to obtain the hand activity data. Additionally, in another aspect, a sampling rate associated with a certain frequency can be employed to obtain the hand activity data. For example, a sampling rate that comprises a frequency of 100 Hz or more can be employed to obtain the hand activity data. The hand activity data can include accelerometer data associated with accelerometer readings of one or more accelerometers of a wrist-worn computational device. In certain embodiments, the accelerometer data can be associated with one or more axis of one or more accelerometers of the wrist-worn computational device. For instance, the accelerometer data included in the hand activity data can include X-axis data associated with an X-axis of an accelerometer, Y-axis data associated with a Y-axis of an accelerometer, and/or Z-axis data associated with a Z-axis of an accelerometer. The hand activity data can additionally or alternatively include gyroscope data associated with gyroscope readings of one or more gyroscope of a wrist-worn computational device. In certain embodiments, the gyroscope data can be associated with one or more axis of one or more gyroscope of the wrist-worn computational device. For instance, the gyroscope data included in the hand activity data can include X-axis data associated with an X-axis of a gyroscope, Y-axis data associated with a Y-axis of a gyroscope, and/or Z-axis data associated with a Z-axis of a gyroscope. Additionally or alternatively, the hand activity data can include bio-acoustic data. The bio-acoustic data included in the hand activity data can be produced, for example, in response to one or more hand activities (e.g., typing, brushing teeth, etc.). For instance, the bio-acoustic data included in the hand activity data can be body-coupled micro-vibrations that propagate through an arm of a user. In an aspect, the bio-acoustic data can include information related to one or more acoustic signals propagated through an arm of a user.

At 1104, employing, by the wrist-worn computational device, a machine learning algorithm to determine classification data indicative of a classification for the human task. For example, the machine learning algorithm can extract and/or model one or more patterns associated with the hand activity data. In an aspect, the machine learning algorithm can identify one or more spatial-temporal relationships encoded in the hand activity data. In another aspect, the classification data can be indicative of a classification for a hand activity associated with the hand activity data. In certain embodiments, the machine learning algorithm can employ a convolutional neural network. For instance, the convolutional neural network can include one or more convolutional units, one or more fully connected layers, one or more dropout layers and/or one or more softmax layers. Furthermore, in certain embodiments, the convolutional neural network can include a batch normalization layers between layers (e.g., non-linear layers) of the convolutional neural network. In an embodiment, a convolutional unit of the convolutional neural network can include one or more sublayers such as, for example, a convolutional operator layer, a batch normalization layer, a rectified linear unit activation layer, and/or a pooling layer. In certain embodiments, the convolutional neural network can include a dropout layer after a fully connected layer to mitigate overfitting. In an embodiment, first spectrogram data associated with the X-axis of the accelerometer, second spectrogram data associated with the Y-axis of the accelerometer, and/or third spectrogram data associated with the Z-axis of the accelerometer can be provided as input to the machine learning algorithm. For example, a first input channel of the machine learning algorithm can receive first spectrogram data associated with the X-axis of the accelerometer, a second input channel of the machine learning algorithm can receive second spectrogram data associated with the Y-axis of the accelerometer, and/or a third input channel of the machine learning algorithm can receive third spectrogram data associated with the Z-axis of the accelerometer. Additionally or alternatively, first spectrogram data associated with the X-axis of the gyroscope, second spectrogram data associated with the Y-axis of the gyroscope, and/or third spectrogram data associated with the Z-axis of the gyroscope can be provided as input to the machine learning algorithm. For example, a first input channel of the machine learning algorithm can receive first spectrogram data associated with the X-axis of the gyroscope, a second input channel of the machine learning algorithm can receive second spectrogram data associated with the Y-axis of the gyroscope, and/or a third input channel of the machine learning algorithm can receive third spectrogram data associated with the Z-axis of the gyroscope.

At 1106, providing, by the wrist-worn computational device, the classification data to an informatics application. For instance, the informatics application can employ the classification data to perform and/or initiate one or more actions related to informatics. In one example, the classification data can be provided to an informatics application associated with the wrist-worn computational device. In another example, the classification data can be provided to an informatics application associated with a mobile device in communication with the wrist-worn computational device. In an embodiment, the informatics application can employ the classification data to initiate one or more actions via the wrist-worn computational device. In certain embodiments, the informatics application can employ the classification data to generate an alert (e.g., an electronic message) via a display of the wrist-worn computational device. In certain embodiments, the informatics application can employ the classification data to additionally or alternatively generate an alert (e.g., an electronic message) via a display of a mobile device (e.g., a smartphone) in communication with the wrist-worn computational device. In certain embodiments, the informatics application can employ the classification data to generate to alter one or more settings and/or one or more configurations of the wrist-worn computational device. The informatics application can be, for example, a personal informatics application, a fitness informatics application, a health-related application, a health assessment application, a healthcare monitoring application, an automatic skill assessment application, a context-awareness application, and/or one or more other applications.

At 1108, it is determined whether additional hand activity data is available. If yes, the computer-implemented method 1100 can return to 1102. If no, the computer-implemented method 1100 can return to 1108 to determine again whether additional hand activity data is available.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Moreover, because at least generating hand activity data, employing a convolutional neural network, etc. are established from a combination of electrical and mechanical components and circuitry, a human is unable to replicate or perform processing performed by the hand activity sensing component 102 (e.g., the IMU component 104, the machine learning component 106, the spectrogram component 202, and/or the convolutional neural network component 302) disclosed herein. For example, a human is unable to perform machine learning associated with a convolutional neural network, etc.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 12:
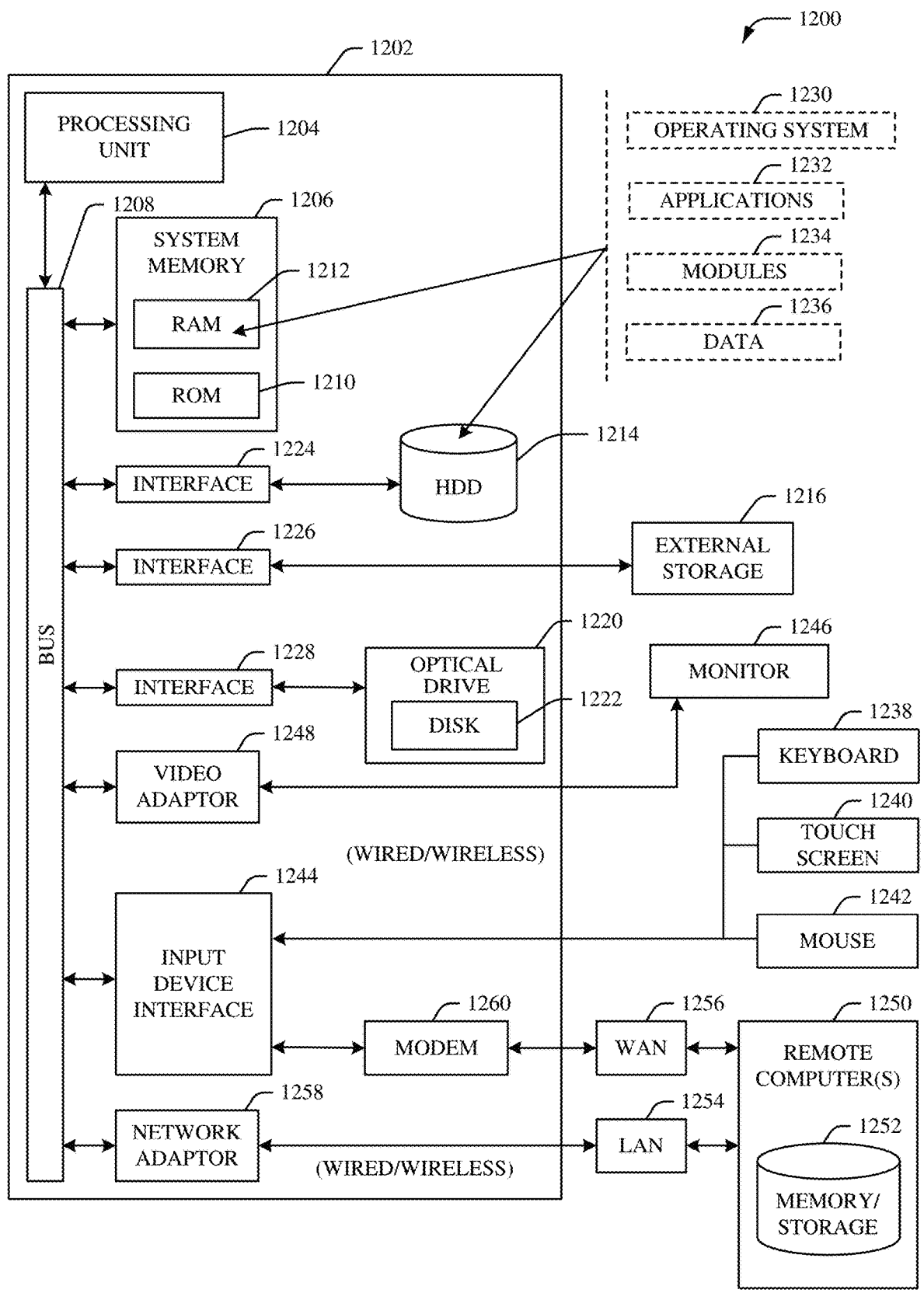
FIG. 12 is a schematic block diagram illustrating a suitable operating environment.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s)

1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 13:
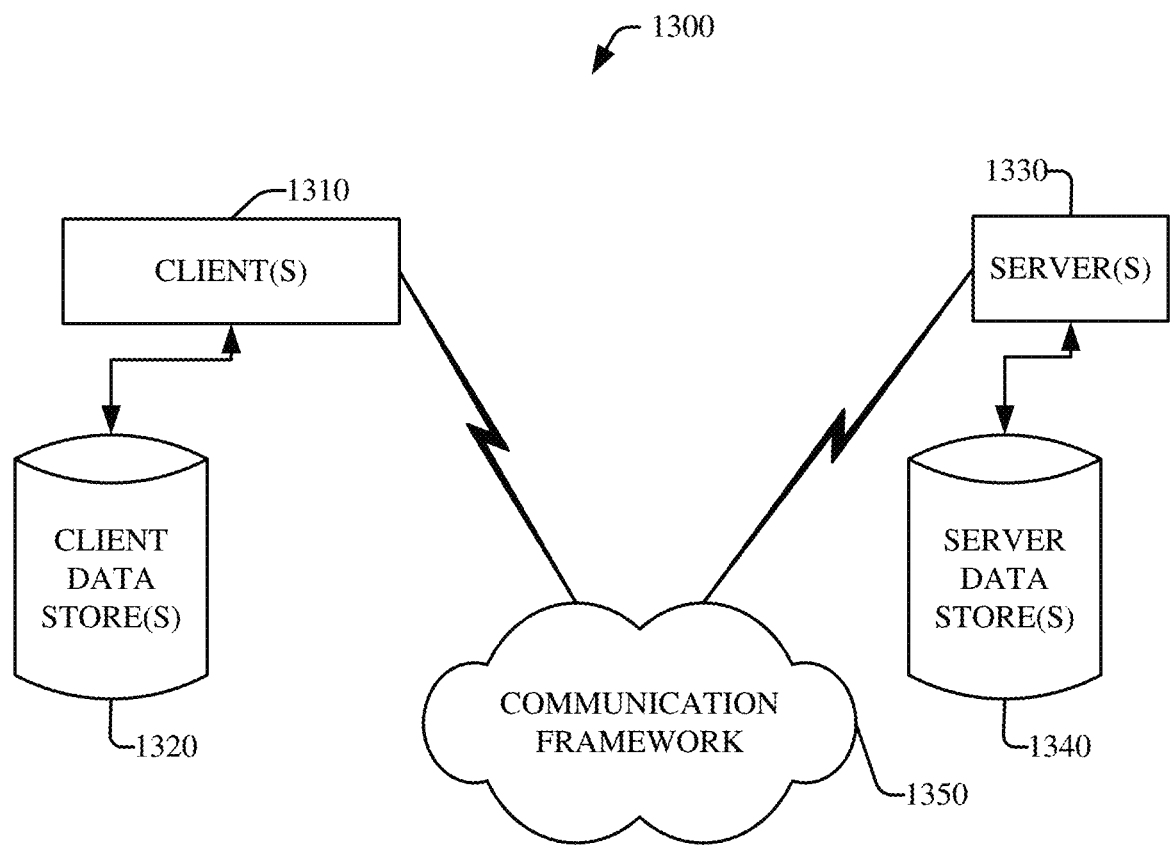
FIG. 13 is a schematic block diagram of a sample-computing environment.

FIG. 13 is a schematic block diagram of a sample-computing environment 1300 with which the subject matter of this disclosure can interact. The system 1300 includes one or more client(s) 1310. The client(s) 1310 can be hardware and/or software (e.g., threads, processes, computing devices). The system 1300 also includes one or more server(s) 1330. Thus, system 1300 can correspond to a two-tier client server model or a multi-tier model (e.g., client, middle tier server, data server), amongst other models. The server(s) 1330 can also be hardware and/or software (e.g., threads, processes, computing devices). The servers 1330 can house threads to perform transformations by employing this disclosure, for example. One possible communication between a client 1310 and a server 1330 may be in the form of a data packet transmitted between two or more computer processes.

The system 1300 includes a communication framework 1350 that can be employed to facilitate communications between the client(s) 1310 and the server(s) 1330. The client(s) 1310 are operatively connected to one or more client data store(s) 1320 that can be employed to store information local to the client(s) 1310. Similarly, the server(s) 1330 are operatively connected to one or more server data store(s) 1340 that can be employed to store information local to the servers 1330.

It is to be noted that aspects or features of this disclosure can be exploited in substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as internet protocol television (IPTV), etc.) can exploit aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

It is to be appreciated and understood that components, as described with regard to a particular system or method, can include the same or similar functionality as respective components (e.g., respectively named components or similarly named components) as described with regard to other systems or methods disclosed herein.

What has been described above includes examples of systems and methods that provide advantages of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
   a memory of a hand activity sensing component that stores computer executable components; and
   a processor of the hand activity sensing component that executes computer executable components stored in the memory, wherein the computer executable components comprise:
   an inertial measurement unit (IMU) component of the hand activity sensing component that obtains, from a wrist-worn computational device comprising the hand activity sensing component, hand activity data associated with a sustained series of hand motor actions in performance of a human task, wherein the human task is characterized by spatial-temporal relationships associated with the wrist-worn computational device over implementation of the human task that are encoded in the hand activity data for the sustained series of hand motor actions in the implementation of the human task, wherein the IMU component characterizes the spatial-temporal relationships based at least in part on an X-axis, a Y-axis, and a Z-axis of at least one accelerometer of the wrist-worn computational device, and wherein the IMU component generates first spectrogram data associated with an X-axis of a gyroscope of the wrist-worn computational device, second spectrogram data associated with a Y-axis of the gyroscope, and third spectrogram data associated with a Z-axis of the gyroscope; and
   a machine learning component of the hand activity sensing component that employs a human task trained machine learning algorithm to determine classification data indicative of a classification for the human task, based at least in part on the spatial-temporal relationships, wherein the machine learning component employs data associated with the X-axis, the Y-axis, and the Z-axis of the at least one accelerometer as input for the machine learning algorithm to determine the classification data, wherein the machine learning component employs the first spectrogram data associated with the X-axis of the gyroscope, the second spectrogram data associated with the Y-axis of the gyroscope, and the third spectrogram data associated with the Z-axis of the gyroscope as input for the machine learning algorithm to determine the classification data, and wherein the machine learning component learns cross-axis relationships among the X-axis of the gyroscope, the Y-axis of the gyroscope, and the Z-axis of the gyroscope to determine the classification data.

2. The system of claim 1, wherein the IMU component employs a data window associated with an interval of time of 2 seconds or more to obtain the hand activity data associated with the sustained series of hand motor actions, and wherein the sustained series of hand motor actions comprises at least one of repeated or disparate hand motor actions in the implementation of the human task.

3. The system of claim 1, wherein the IMU component employs a sampling rate that comprises a frequency of 100 Hz or more to obtain the hand activity data.

4. The system of claim 1, wherein the IMU component generates first spectrogram data associated with an X-axis of the at least one accelerometer, second spectrogram data associated with a Y-axis of the at least one accelerometer, and third spectrogram data associated with a Z-axis of the at least one accelerometer, and wherein the machine learning component provides the first spectrogram data associated with the X-axis of the at least one accelerometer, the second spectrogram data associated with the Y-axis of the at least one accelerometer, and the third spectrogram data associated with the Z-axis of the at least one accelerometer as input for the machine learning algorithm to determine the classification data.

5. The system of claim 1, wherein the machine learning component provides the classification data to an informatics application associated with the wrist-worn computational device.

6. The system of claim 1, wherein the machine learning component provides the classification data to an informatics application associated with a mobile device in communication with the wrist-worn computational device.

7. A method, comprising:
obtaining, by a wrist-worn computational device comprising a processor, a memory, and a hand activity sensing component, hand activity data associated with a sustained series of hand motor actions in performance of a human task, wherein the human task is characterized by spatial-temporal relationships associated with the wrist-worn computational device over implementation of the human task that are encoded in the hand activity data for the sustained series of hand motor actions in the implementation of the human task, wherein the obtaining the hand activity data comprises characterizing the spatial-temporal relationships based at least in part on an X-axis, a Y-axis, and a Z-axis of at least one accelerometer included in the wrist-worn computational device, and wherein the obtaining the hand activity data comprises:
generating first spectrogram data associated with an X-axis of a gyroscope included in the wrist-worn computational device;
generating second spectrogram data associated with a Y-axis of the gyroscope;
generating third spectrogram data associated with a Z-axis of the gyroscope, wherein the employing the machine learning algorithm comprises employing the first spectrogram data associated with the X-axis of the gyroscope, the second spectrogram data associated with the Y-axis of the gyroscope, and the third spectrogram data associated with the Z-axis of the gyroscope as input for the machine learning algorithm;
employing, by the hand activity sensing component of the wrist-worn computational device, a human task trained machine learning algorithm to determine classification data indicative of a classification for the human task, based at least in part on the spatial-temporal relationships, wherein the employing the human task trained machine learning algorithm comprises employing data associated with the X-axis, the Y-axis, and the Z-axis of the at least one accelerometer as input for the machine learning algorithm; and
determining the classification data based at least in part on the human task trained machine learning algorithm learning cross-axis relationships among the X-axis of the gyroscope, the Y-axis of the gyroscope, and the Z-axis of the gyroscope.

8. The method of claim 7, wherein the obtaining the hand activity data comprises obtaining the hand activity data from an accelerometer of the wrist-worn computational device.

9. The method of claim 7, wherein the obtaining the hand activity data comprises obtaining the hand activity data from a gyroscope of the wrist-worn computational device.

10. The method of claim 7, wherein the obtaining the hand activity data associated with the sustained series of hand motor actions comprises employing a data window associated with an interval of time of 2 seconds or more, wherein the sustained series of hand motor actions comprises at least one of repeated or disparate hand motor actions in the implementation of the human task, and employing a sampling rate that comprises a frequency of 100 Hz or more.

11. The method of claim 7, wherein the obtaining the hand activity data comprises:
generating first spectrogram data associated with an X-axis of the at least one accelerometer;
generating second spectrogram data associated with a Y-axis of the at least one accelerometer; and
generating third spectrogram data associated with a Z-axis of the at least one accelerometer, wherein the employing the machine learning algorithm comprises providing the first spectrogram data associated with the X-axis of the at least one accelerometer, the second spectrogram data associated with the Y-axis of the at least one accelerometer, and the third spectrogram data associated with the Z-axis of the at least one accelerometer as input for the machine learning algorithm.

12. The method of claim 7, further comprising:
providing, by the wrist-worn computational device, the classification data to an informatics application associated with the wrist-worn computational device.

13. The method of claim 7, further comprising:
providing, by the wrist-worn computational device, the classification data to an informatics application associated with a mobile device in communication with the wrist-worn computational device.

14. A computer readable storage device comprising instructions that, in response to execution, cause a system comprising a processor to perform operations, comprising:
obtaining, from a wrist-worn computational device, comprising a processor, a memory, and a hand activity sensing component, hand activity data associated with a sustained series of hand motor actions in performance of a human task, wherein the human task is characterized by spatial-temporal relationships associated with the wrist-worn computational device over implementation of the human task that are encoded in the hand activity data for the sustained series of hand motor actions in the implementation of the human task, wherein the obtaining the hand activity data comprises characterizing the spatial-temporal relationships based at least in part on an X-axis, a Y-axis, and a Z-axis of at least one accelerometer of the wrist-worn computational device, and wherein the obtaining the hand activity data comprises:
generating first spectrogram data associated with an X-axis of a gyroscope of the wrist-worn computational device that characterizes the spatial-temporal relationships;
generating second spectrogram data associated with a Y-axis of the gyroscope;
generating third spectrogram data associated with a Z-axis of the gyroscope, wherein the employing the machine learning technique comprises employing the first spectrogram data associated with the X-axis of the gyroscope, the second spectrogram data associated with the Y-axis of the gyroscope, and the third spectrogram data associated with the Z-axis of the gyroscope as input for the machine learning technique;
employing, by the hand activity sensing component of the wrist-worn computational device, a human task trained machine learning technique to determine classification data indicative of a classification for the human task, based at least in part on the spatial-temporal relationships, and wherein the employing the human task trained machine learning technique comprises employing data associated with the X-axis, the Y-axis, and the Z-axis of the at least one accelerometer as input for the machine learning technique; and determining the classification data based at least in part on the human task trained machine learning algorithm learning cross-axis relationships among the X-axis of the gyroscope, the Y-axis of the gyroscope, and the Z-axis of the gyroscope.

15. The computer readable storage device of claim 14, wherein the obtaining the hand activity data associated with the sustained series of hand motor actions comprises employing a data window associated with an interval of time of 2 seconds or more, wherein the sustained series of hand motor actions comprises at least one of repeated or disparate hand motor actions in the implementation of the human task.

16. The computer readable storage device of claim 14, wherein the obtaining the hand activity data comprises employing a sampling rate that comprises a frequency of 100 Hz or more.

17. The computer readable storage device of claim 14, wherein the obtaining the hand activity data comprises:
generating first spectrogram data associated with an X-axis of the at least one accelerometer;
generating second spectrogram data associated with a Y-axis of the at least one accelerometer; and
generating third spectrogram data associated with a Z-axis of the at least one accelerometer, wherein the employing the human task trained machine learning technique comprises providing the first spectrogram data associated with the X-axis of the at least one accelerometer, the second spectrogram data associated with the Y-axis of the at least one accelerometer, and the third spectrogram data associated with the Z-axis of the at least one accelerometer as input for the machine learning technique.

* * * * *